United States Patent
Kang et al.

(10) Patent No.: US 11,190,254 B2
(45) Date of Patent: Nov. 30, 2021

(54) METHOD AND APPARATUS FOR REPORTING CHANNEL STATE INFORMATION IN A WIRELESS COMMUNICATION SYSTEM

(71) Applicant: LG Electronics Inc., Seoul (KR)

(72) Inventors: Jiwon Kang, Seoul (KR); Haewook Park, Seoul (KR); Hyungtae Kim, Seoul (KR); Jonghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/064,330

(22) PCT Filed: Apr. 27, 2018

(86) PCT No.: PCT/KR2018/004975
§ 371 (c)(1),
(2) Date: Feb. 3, 2020

(87) PCT Pub. No.: WO2018/199704
PCT Pub. Date: Nov. 1, 2018

(65) Prior Publication Data
US 2021/0050895 A1      Feb. 18, 2021

Related U.S. Application Data

(60) Provisional application No. 62/616,453, filed on Jan. 12, 2018, provisional application No. 62/491,318, filed on Apr. 28, 2017.

(51) Int. Cl.
*H04B 7/06*      (2006.01)
*H04W 76/27*    (2018.01)
(Continued)

(52) U.S. Cl.
CPC ......... *H04B 7/0626* (2013.01); *H04B 7/0417* (2013.01); *H04B 7/0456* (2013.01);
(Continued)

(58) Field of Classification Search
None
See application file for complete search history.

(56) References Cited

U.S. PATENT DOCUMENTS

2013/0114530 A1*  5/2013  Chen ................... H04W 72/042
                                                                370/329
2014/0241149 A1*  8/2014  Liu ....................... H04W 24/02
                                                                370/228
(Continued)

FOREIGN PATENT DOCUMENTS

CN    101902263    12/2010
CN    103262604    8/2013
(Continued)

OTHER PUBLICATIONS

Ericsson "On CSI reporting for short PUCCH," R1-1705920, 3GPP TSG-RAN WG1 #88bis, Spokane, Washington, US, Apr. 3-7, 2017, 2 pages.
(Continued)

*Primary Examiner* — Hassan A Phillips
*Assistant Examiner* — Gautam Sharma
(74) *Attorney, Agent, or Firm* — Fish & Richardson P.C.

(57)  ABSTRACT

A method for reporting channel state information (CSI) in a wireless communication system is disclosed. The method for reporting, by a user equipment (UE), CSI includes determining a physical uplink control channel (PUCCH) format type for reporting the CSI according to a CSI feedback type, wherein the PUCCH format type is a short PUCCH or a long PUCCH; and reporting the CSI to a base station through the determined PUCCH format type.

6 Claims, 13 Drawing Sheets

(51) Int. Cl.
*H04B 7/0417* (2017.01)
*H04B 7/0456* (2017.01)
*H04W 72/04* (2009.01)

(52) U.S. Cl.
CPC ............ *H04B 7/065* (2013.01); *H04B 7/0632* (2013.01); *H04B 7/0639* (2013.01); *H04B 7/0695* (2013.01); *H04W 72/0413* (2013.01); *H04W 72/0493* (2013.01); *H04W 76/27* (2018.02)

(56) References Cited

U.S. PATENT DOCUMENTS

| | | | |
|---|---|---|---|
| 2014/0328426 | A1 | 11/2014 | Kim et al. |
| 2015/0063282 | A1 | 3/2015 | Kim et al. |
| 2017/0005767 | A1 | 1/2017 | Kang et al. |
| 2017/0041922 | A1* | 2/2017 | Chen ................ H04W 72/1268 |
| 2017/0041923 | A1* | 2/2017 | Park ..................... H04L 5/0053 |
| 2018/0027547 | A1* | 1/2018 | Lyu .................... H04W 72/0413 370/329 |
| 2018/0042015 | A1* | 2/2018 | Yin ....................... H04L 1/1861 |
| 2018/0076917 | A1* | 3/2018 | Pan ..................... H04J 13/0062 |
| 2018/0097609 | A1* | 4/2018 | Tiirola .................... H04L 5/143 |
| 2018/0115402 | A1* | 4/2018 | Takahashi ........... H04W 52/267 |

FOREIGN PATENT DOCUMENTS

| | | |
|---|---|---|
| CN | 104584450 | 4/2015 |
| WO | WO17/026877 | 2/2017 |

OTHER PUBLICATIONS

Ericsson, "CSI Framework," R1-1700755, 3GPP TSG-RAN WG1 #87ah-NR, Spokane, WA, USA, Jan. 16-20, 2017, 7 pages.

LG Electronics, "Design of short NR-PUCCH format," R1-1702479, 3GPP TSG RAN WG1 Meeting #88, Athens, Greece Feb. 13-17, 2017, 7 pages.

Ericsson, "On CSI reporting for short PUCCH," R1-1705920, 3GPP TSG RAN WG1 Meeting #88bis, Spokane, Washington, Mar. 25, 2017, 4 pages.

Ericsson, "Type I CSI codebook," R1-1705898, 3GPP TSG RAN WG1 Meeting #88bis, Spokane, U.S., Mar. 25, 2017, 14 pages.

Samsung, "Structures for Long PUCCH," R1-1705391, 3GPP TSG RAN WG1 Meeting #88bis, Spokane, USA, Mar. 25, 2017, 6 pages.

Qualcomm Incorporated, "1ms TTI and sTTI Collision in the Uplink," R1-1704985, 3GPP TSG RAN WG1 Meeting #88bis, Spokane, USA, Mar. 25, 2017, 5 pages.

Ericsson, "On Long PUCCH," R1-1703294, 3GPP TSG RAN WG1 #88, 3GPP (Feb. 6, 2017.), 3 pages.

NTT Docomo et al., "Summary of [87-32]: UL L1/L2 control channel design for NR," R1-1700618, 3GPP TSG RAN WG1 #AH, 3GPP (Jan. 13, 2017.), 30 pages.

Extended European Search Report in European Appln. No. 18791086.4, dated Oct. 6, 2020, 12 pages.

Satoshi Nagata, "Status Report for RAN WG1 to TSG-RAN #74," RP-161937, 3GPP TSG RAN #74, Vienna, Austria, Dec. 5-8, 2016, 42 pages.

CATT, "Discussion on Type I feedback," R1-1700222, 3GPP TSG RAN WG1 AH_Nr Meeting, Spokane, USA, Jan. 16-20, 2017, 3 pages.

Huawei, HiSilicon, "Design for Type II Feedback," R1-1703344, 3GPP TSG RAN WG1 Meeting #88, Athens, Greece, Feb. 13-17, 2017, 8 pages.

LG Electronics, "Views on CSI acquisition for NR" R1-1609253, 3GPP TSG RAN WG1 Meeting #86b, Lisbon, Portugal Oct. 10-14, 2016, 7 pages.

Mitsubishi Electric, "Transmit diversity for PUCCH in long duration," R1-1704813, 3GPP TSG-RAN WG1 #88b, Spokane, Washington, Apr. 3-7, 2017, 8 pages.

Office Action in Chinese Appln. No. 201880028174.5, dated Aug. 31, 2021, 15 pages (with English translation).

Sharp, "UCT reporting on PUCCH and PUSCH," R1-1700729, 3GPP TSG RAN WG1 NR Ad Hoc Meeting, Spokane, USA, Jan. 16-20, 2017, 3 pages.

\* cited by examiner

Figure 8

| | | PMI Feedback Type | |
|---|---|---|---|
| | | No PMI (OL, TD, single-antenna) | With PMI (CL) |
| PUSCH CQI Feedback type | Wideband (Wideband CQI) | | Mode 1-2: Multiple PMI<br>RI<br>$1^{st}$ wideband CQI (4bit)<br>$2^{nd}$ wideband CQI (4bit) if RI>1<br>Subband PMIs on each subband |
| | UE Selected (subband CQI) | Mode 2-0<br>RI (only for Open-loop SM)<br>Wideband CQI (4bit)+Best-M CQI (2bit)<br>Best-M index<br>when RI>1, CQI of first codeword | Mode 2-2: Multiple PMI<br>RI<br>$1^{st}$ wideband CQI (4bit)+Best-M CQI (2bit)<br>$2^{nd}$ wideband CQI (4bit)+Best-M CQI (2bit) if RI>1<br>Wideband PMI    Best-M PMI<br>Best-M index |
| | Higher layer-configured (subband CQI) | Mode 2-0<br>RI (only for Open-loop SM)<br>Wideband CQI (4bit)+subband CQI (2bit)<br>when RI>1, CQI of first codeword | Mode 3-1: Single PMI<br>RI<br>$1^{st}$ wideband CQI (4bit)+subband CQI (2bit)<br>$2^{nd}$ wideband CQI (4bit)+subband CQI (2bit) if RI>1<br>Wideband PMI |

Figure 9

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-loop SM)]<br>One wideband CQI (4bit)]<br>when RI>1, CQI of first codeword | Mode 1-1<br>RI]<br>Wideband CQI (4bit)<br>Wideband spatial CQI (3bit) for RI>1<br>Wideband PMI (4bit) ] |
| | UE Selected | Mode 2-0<br>RI (only for Open-loop SM) ]<br>Wideband CQI (4bit) ]<br>Best-1 CQI (4bit) in each BP<br>Best-1 indicator (L-bit label) ]<br>when RI>1, CQI of first codeword | Mode 2-1<br>RI ]<br>Wideband CQI (4bit)<br>Wideband spatial CQI (3bit) for RI>1<br>Wideband PMI (4bit) ]<br>Best-1 CQI (4bit) 1 in each BP<br>Best-1 spatial CQI (3bit) for RI>1<br>Best-1 indicator (L-bit label) ] |

METHOD AND APPARATUS FOR REPORTING CHANNEL STATE INFORMATION IN A WIRELESS COMMUNICATION SYSTEM

CROSS-REFERENCE TO RELATED APPLICATIONS

This application is a National Stage application under 35 U.S.C. § 371 of International Application No. PCT/KR2018/004975, filed on Apr. 27, 2018, which claims the benefit of U.S. Provisional Application No. 62/616,453, filed on Jan. 12, 2018, and U.S. Provisional Application No. 62/491,318, filed on Apr. 28, 2017. The disclosures of the prior applications are incorporated by reference in their entirety.

TECHNICAL FIELD

The present invention relates to a wireless communication system, and more particularly to a method for reporting channel state information (CSI) and an apparatus supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

An object of the present specification is to provide a method for transmitting CSI feedback on short PUCCH or long PUCCH considering a CSI feedback type, an amount of CSI feedback information, and the like.

Another object of the present specification is to provide a method for updating CSI on short PUCCH.

Another object of the present specification is to provide a method for, when an overlap or a collision occurs between short PUCCH and long PUCCH, solving the overlap or the collision.

Technical problems to be solved by the present invention are not limited by the above-mentioned technical problems, and other technical problems which are not mentioned above can be clearly understood from the following description by those skilled in the art to which the present invention pertains.

Technical Solution

The present specification provides a method for reporting, by a user equipment (UE), channel state information (CSI) in a wireless communication system, the method comprising determining a physical uplink control channel (PUCCH) format type for reporting the CSI according to a CSI feedback type, wherein the PUCCH format type is a short PUCCH or a long PUCCH; and reporting the CSI to a base station through the determined PUCCH format type, wherein when the determined PUCCH format type is the short PUCCH, the reported CSI supports a type I CSI feedback, wherein when the determined PUCCH format type is the long PUCCH, the reported CSI supports the type I CSI feedback and a type II CSI feedback.

In the present specification, the CSI reported on the short PUCCH does not support a type I subband (SB) CSI feedback.

In the present specification, the CSI reported on the long PUCCH supports a type I subband (SB) CSI feedback.

In the present specification, the reported CSI is configured as periodic or semi-persistent.

In the present specification, the type I CSI feedback is related to beam selection and/or co-phasing on layers through W2 after beam group selection through W1, and the type II CSI feedback is related to beam selection and/or co-phasing on layers through W2 after beam group selection through W1.

In the present specification, the long PUCCH includes PUCCH format 4, and an amount of CSI transmitted on the PUCCH format 4 is up to 115 bits.

In the present specification, when the short PUCCH and the long PUCCH partially or entirely overlap each other in the same time and frequency resources, the short PUCCH is transmitted preferentially.

In the present specification, when the CSI is reported on the long PUCCH and supports a type II CSI subband (SB) feedback, a part of the CSI is reported.

The present specification provides a user equipment (UE) for reporting channel state information (CSI) in a wireless communication system, the UE comprising a radio frequency (RF) module for transmitting and receiving a radio signal; and a processor functionally connected to the RF module, wherein the processor is configured to determine a physical uplink control channel (PUCCH) format type for reporting the CSI according to a CSI feedback type, wherein the PUCCH format type is a short PUCCH or a long PUCCH; and report the CSI to a base station through the determined PUCCH format type, wherein when the determined PUCCH format type is the short PUCCH, the reported CSI supports a type I CSI feedback, wherein when the determined PUCCH format type is the long PUCCH, the reported CSI supports the type I CSI feedback and a type II CSI feedback.

Advantageous Effects

The present specification has an effect capable of facilitating UE implementation by configuring a restriction on short PUCCH or long PUCCH used in CSI feedback considering a CSI feedback type, an amount of CSI feedback information, and the like.

Effects obtainable from the present invention are not limited by the above-mentioned effect, and other effects which are not mentioned above can be clearly understood from the following description by those skilled in the art to which the present invention pertains.

DESCRIPTION OF DRAWINGS

The accompanying drawings, that are included to provide a further understanding of the invention and are incorporated in and constitute a part of the present specification, illustrate embodiments of the invention and together with the description serve to explain various principles of the invention.

FIG. 8 illustrates an example of a PUSCH CSI reporting mode.

FIG. 9 illustrates an example of a PUCCH CSI reporting mode.

MODE FOR INVENTION

Figure 1:
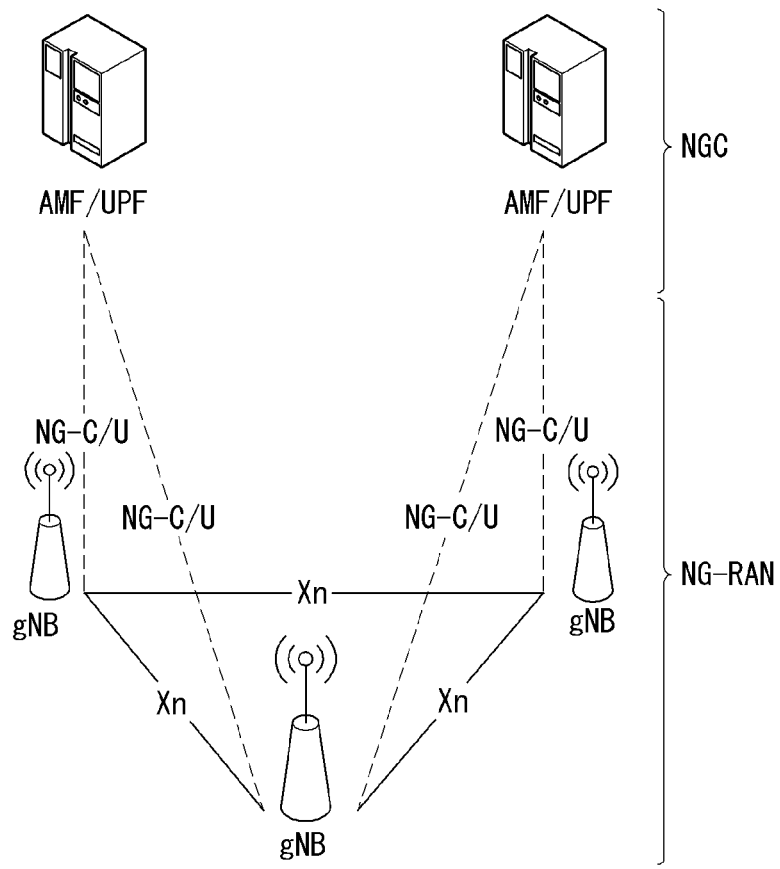
FIG. 1 illustrates an example of an overall structure of a new radio (NR) system to which a method proposed by the present specification is applicable.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s = 1/(\Delta f_{max} \cdot N_f)$. In this case $\Delta f_{max} = 480 \cdot 10^3$, and $N_f = 4096$ DL and UL transmission is configured as a radio frame having a section of $T_f = (\Delta f_{max} N_f/100) \cdot T_s = 10$ ms. The radio frame is composed of ten subframes each having a section of $T_{sf} = (\Delta f_{max} N_f/1000) \cdot T_s = 1$ ms. In this case, there may be a set of UL frames and a set of DL frames.

Figure 2:
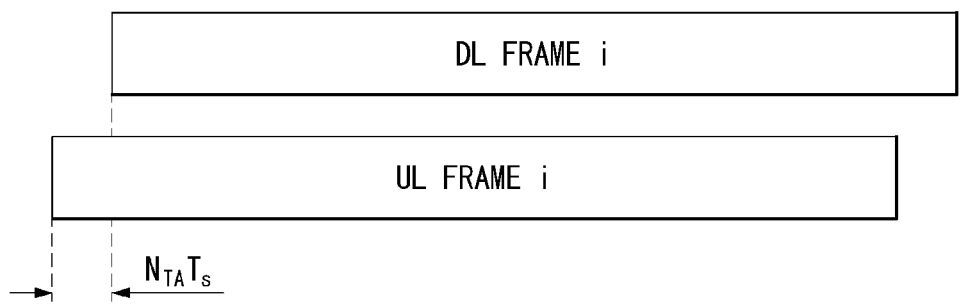
FIG. 2 illustrates a relationship between an uplink frame and a downlink frame in a wireless communication system to which a method proposed by the present specification is applicable.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA} = N_{TA} T_s$ before the start of a corresponding DL frame in the UE.

Regarding the numerology μ, slots are numbered in ascending order of $n_s^{\mu} \in \{0, \ldots, N_{subframe}^{slots,\mu} - 1\}$ in a subframe, and in ascending order of $n_{s,f}^{\mu} \in \{0, \ldots, N_{frame}^{slots,\mu} - 1\}$ in a radio frame. One slot is composed of continuous OFDM symbols of $N_{symb}^{\mu}$, and $N_{symb}^{\mu}$ is determined depending on a numerology in use and slot configuration. The start of slots $n_s^{\mu}$ in a subframe is temporally aligned with the start of OFDM symbols $n_s^{\mu} N_{symb}^{\mu}$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| μ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
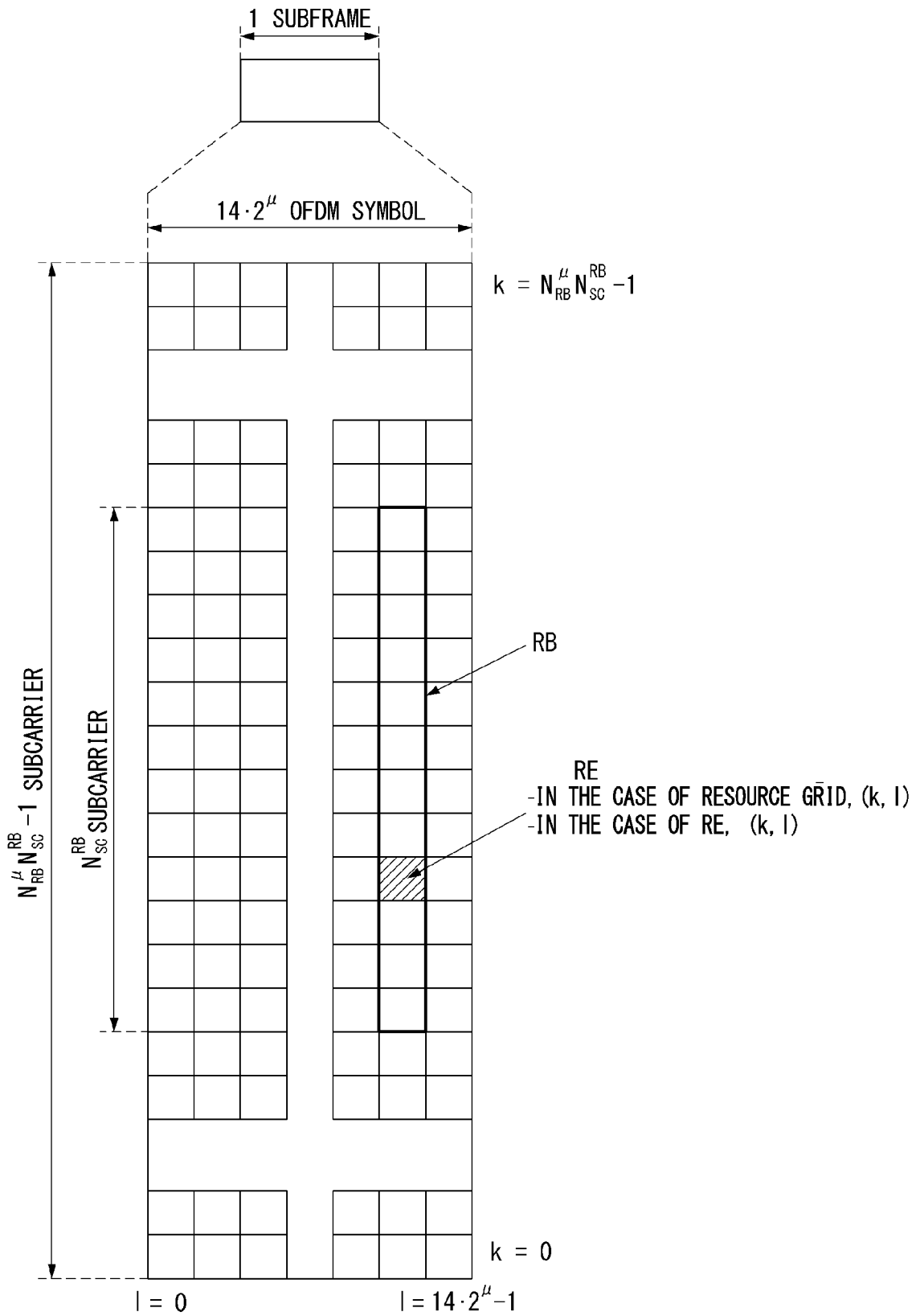
FIG. 3 illustrates an example of a resource grid supported in a wireless communication system to which a method proposed by the present specification is applicable.

FIG. 3 illustrates an example of a resource grid supported in a wireless communication system to which a method proposed by the present disclosure may be implemented.

Referring to FIG. 3, a resource grid is composed of $N_{RB}^{\mu}N_{sc}^{RB}$ subcarriers in a frequency domain, each subframe composed of $14 \cdot 2^{\mu}$ OFDM symbols, but the present disclosure is not limited thereto.

In the NR system, a transmitted signal is described by one or more resource grids, composed of $N_{RB}^{\mu}N_{sc}^{RB}$ subcarriers, and $2^{\mu}N_{symb}^{(\mu)}$ OFDM symbols. Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 3, one resource grid may be configured for the numerology $\mu$ and an antenna port p.

Figure 4:
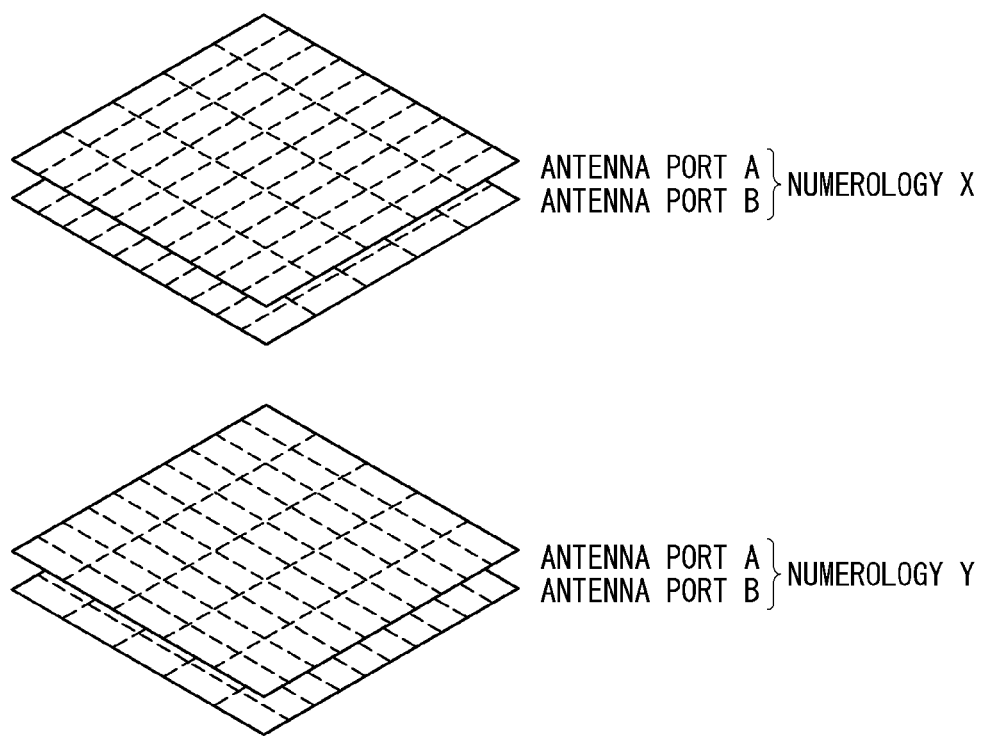
FIG. 4 illustrates examples of a resource grid per antenna port and numerology to which a method proposed by the present specification is applicable.

FIG. 4 illustrates examples of a resource grid per antenna port and numerology to which a method proposed by the present specification is applicable.

Each element of the resource grid for the numerology $\mu$ and the antenna port p is indicated as a resource element, and may be uniquely identified by an index pair (k,l). Herein, $k=0, \ldots, N_{RB}^{\mu}N_{sc}^{RB}-1$ is an index in the frequency domain, and $l=0, \ldots, 2^{\mu}N_{symb}^{(\mu)}$ indicates a location of a symbol in a subframe. To indicate a resource element in a slot, the index pair (k, l) is used. Herein, $l=0, \ldots, N_{symb}^{\mu}-1$.

The resource element (k,l) for the numerology $\mu$ and the antenna port p corresponds to a complex value $a_{k,l}^{(p,\mu)}$. When there is no risk of confusion or when a specific antenna port or numerology is specified, the indexes p and $\mu$ may be dropped and thereby the complex value may become $a_{k,l}^{(p)}$ or $a_{k,l}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \qquad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Uplink Control Channel

Physical uplink control signaling should be able to carry at least hybrid-ARQ acknowledgements, CSI reports (possibly including beamforming information), and scheduling requests.

At least two transmission methods are supported for an UL control channel supported in an NR system.

The UL control channel can be transmitted in short duration around last transmitted UL symbol(s) of a slot. In this case, the UL control channel is time-division-multiplexed and/or frequency-division-multiplexed with an UL data channel in a slot. For the UL control channel in short duration, transmission over one symbol duration of a slot is supported.

- Short uplink control information (UCI) and data are frequency-division-multiplexed both within a UE and between UEs at least for the case where physical resource blocks (PRBs) for short UCI and data do not overlap.
- In order to support time division multiplexing (TDM) of a short PUCCH from different UEs in the same slot, a mechanism is supported to inform the UE of whether or not symbol(s) in a slot to transmit the short PUCCH is supported at least above 6 GHz.
- At least following is supported for the PUCCH in 1-symbol duration: 1) UCI and a reference signal (RS) are multiplexed in a given OFDM symbol in a frequency division multiplexing (FDM) manner if an RS is multiplexed, and 2) there is the same subcarrier spacing between downlink (DL)/uplink (UL) data and PUCCH in short-duration in the same slot.
- At least a PUCCH in short-duration spanning 2-symbol duration of a slot is supported. In this instance, there is the same subcarrier spacing between DL/UL data and the PUCCH in short-duration in the same slot.
- At least semi-static configuration, in which a PUCCH resource of a given UE within a slot. i.e., short PUCCHs of different UEs can be time-division multiplexed within a given duration in a slot, is supported.

The PUCCH resource includes a time domain, a frequency domain, and when applicable, a code domain.

The PUCCH in short-duration can span until an end of a slot from UE perspective. In this instance, no explicit gap symbol is necessary after the PUCCH in short-duration.

For a slot (i.e., DL-centric slot) having a short UL part, 'short UCI' and data can be frequency-division multiplexed by one UE if data is scheduled on the short UL part.

The UL control channel can be transmitted in long duration over multiple UL symbols so as to improve coverage. In this case, the UL control channel is frequency-division-multiplexed with the UL data channel within a slot.

UCI carried by a long duration UL control channel at least with a low peak to average power ratio (PAPR) design can be transmitted in one slot or multiple slots.

Transmission across multiple slots is allowed for a total duration (e.g. 1 ms) for at least some cases.

In the case of the long duration UL control channel, the TDM between the RS and the UCI is supported for DFT-S-OFDM.

A long UL part of a slot can be used for transmission of PUCCH in long-duration. That is, the PUCCH in long-duration is supported for both a UL-only slot and a slot having the variable number of symbols comprised of a minimum of 4 symbols.

For at least 1 or 2 UCI bits, the UCI can be repeated within N slots (N>1), and the N slots may be adjacent or may not be adjacent in slots where PUCCH in long-duration is allowed.

Simultaneous transmission of PUSCH and PUCCH for at least the long PUCCH is supported. That is, uplink control on PUCCH resources is transmitted even in the case of the presence of data. In addition to the simultaneous PUCCH-PUSCH transmission, UCI on the PUSCH is supported.

Intra-TTI slot frequency-hopping is supported.

DFT-s-OFDM waveform is supported.

Transmit antenna diversity is supported.

Both the TDM and the FDM between the short duration PUCCH and the long duration PUCCH are supported for different UEs in at least one slot. In a frequency domain, a PRB (or multiple PRBs) is a minimum resource unit size for the UL control channel. If hopping is used, a frequency resource and the hopping may not spread over a carrier bandwidth. Further, a UE-specific RS is used for NR-PUCCH transmission. A set of PUCCH resources is configured by higher layer signaling, and a PUCCH resource within the configured set is indicated by downlink control information (DCI).

As part of the DCI, timing between data reception and hybrid-ARQ acknowledgement transmission should be able to be dynamically indicated (at least in combination with RRC). A combination of the semi-static configuration and (for at least some types of UCI information) dynamic signaling is used to determine the PUCCH resource for both 'long and short PUCCH formats'. Here, the PUCCH resource includes a time domain, a frequency domain, and when applicable, a code domain. The UCI on the PUSCH, i.e., using some of the scheduled resources for the UCI is supported in case of simultaneous transmission of UCI and data.

At least UL transmission of at least single HARQ-ACK bit is supported. A mechanism enabling the frequency diversity is supported. In case of ultra-reliable and low-latency communication (URLLC), a time interval between scheduling request (SR) resources configured for a UE can be less than a slot.

Beam Management

In NR, beam management is defined as follows.

Beam management: a set of L1/L2 procedures to acquire and maintain a set of TRP(s) and/or UE beams that can be used for DL and UL transmission/reception, which includes at least following aspects:

Beam determination: an operation for TRP(s) or UE to select its own transmission/reception beam.

Beam measurement: an operation for TRP(s) or UE to measure characteristics of received beamformed signals.

Beam reporting: an operation for UE to report information of beamformed signal based on beam measurement.

Beam sweeping: an operation of covering a spatial area using transmitted and/or received beams during a time interval in a predetermined way.

Also, the followings are defined as Tx/Rx beam correspondence at the TRP and the UE.

Tx/Rx beam correspondence at TRP holds if at least one of the followings is satisfied.

The TRP is able to determine a TRP reception beam for the uplink reception based on UE's downlink measurement on TRP's one or more transmission beams.

The TRP is able to determine a TRP Tx beam for the downlink transmission based on TRP's uplink measurement on TRP's one or more Rx beams.

Tx/Rx beam correspondence at UE holds if at least one of the followings is satisfied.

The UE is able to determine a UE Tx beam for the uplink transmission based on UE's downlink measurement on UE's one or more Rx beams.

The UE is able to determine a UE reception beam for the downlink reception based on TRP's indication based on uplink measurement on UE's one or more Tx beams.

Capability indication of UE beam correspondence related information to TRP is supported.

The following DL L1/L2 beam management procedures are supported within one or multiple TRPs.

P-1: is used to enable UE measurement on different TRP Tx beams so as to support selection of TRP Tx beams/UE Rx beam(s).

In case of beamforming at the TRP, it generally includes intra/inter-TRP Tx beam sweep from a set of different beams. For beamforming at the UE, it typically includes UE Rx beam sweep from a set of different beams.

P-2: is used to enable UE measurement on different TRP Tx beams to change inter/intra-TRP Tx beam(s).

P-3: is used to enable UE measurement on the same TRP Tx beam to change UE Rx beam in the case where the UE uses beamforming.

At least network triggered aperiodic reporting is supported under P-1, P-2, and P-3 related operations.

The UE measurement based on an RS for the beam management (at least CSI-RS) is composed of K beams (where K is a total number of beams), and the UE reports measurement results of N selected Tx beams, where N is not necessarily fixed number. A procedure based on an RS for mobility purpose is not precluded. Reporting information at least includes measurement quantities for N beam(s) and information indicating N DL transmission beam(s), if N<K. Specifically, for K'>1 non-zero power (NZP) CSI-RS resources of the UE, the UE can report N' CRI (CSI-RS resource indicator).

The UE can be configured with the following higher layer parameters for beam management.

N≥1 reporting settings, M≥1 resource settings

Links between reporting settings and resource settings are configured in the agreed CSI measurement setting.

CSI-RS based P-1 and P-2 are supported with resource and reporting settings.

P-3 can be supported with or without the reporting setting.

A reporting setting including at least the followings

Information indicating selected beam

L1 measurement reporting

Time domain behavior (e.g. aperiodic operation, periodic operation, and semi-persistent operation)

Frequency granularity if several frequency granularities are supported

A resource setting including at least the followings

Time domain behavior (e.g. aperiodic operation, periodic operation, and semi-persistent operation)

RS type: at least NZP CSI-RS

At least one CSI-RS resource set. Each CSI-RS resource set includes K≥1 CSI-RS resources (some parameters of K CSI-RS resources may be the same. For example, port number, time domain behavior, density and periodicity).

Also, NR supports the following beam reporting considering L groups, where L>1.

Information indicating at least group

Measurement quantity for N1 beam (supporting of L1 RSRP and CSI report (when CSI-RS is for CSI acquirement))

Information indicating N1 DL transmission beam, if applicable

The above-described group based beam reporting can be configured per UE basis. The above group based beam reporting can be turned off per UE basis (e.g. when L=1 or N1=1).

NR supports that the UE can trigger a mechanism recovering from a beam failure.

A beam failure event occurs when the quality of beam pair link(s) of an associated control channel is low enough (e.g. comparison with a threshold value, time-out of an associated timer). The mechanism to recover from the beam failure (or beam obstacle) is triggered when the beam failure occurs.

A network explicitly configures to the UE with resources for transmitting UL signals for recovery purpose. Configurations of resources are supported where the base station is listening from all or some directions (e.g. random access region).

The UL transmission/resources to report the beam failure can be located at the same time instance as PRACH (resources orthogonal to PRACH resources) or at a time instance (configurable for the UE) different from the PRACH. The transmission of DL signal is supported for allowing the UE to monitor beams for identifying new potential beams.

NR supports the beam management regardless of a beam-related indication. When the beam-related indication is provided, information pertaining to a UE-side beamforming/receiving procedure used for CSI-RS-based measurement can be indicated to the UE through QCL.

As QCL parameters to support in NR, a spatial parameter for beamforming at a receiver will be added as well as parameters for delay, Doppler, average gain, etc. that have been used in a LTE system. The QCL parameters may include angle-of-arrival related parameters from UE reception beamforming perspective and/or angle-of-departure related parameters from base station reception beamforming perspective.

NR supports using the same beam or different beams on control channel and corresponding data channel transmissions.

For NR-PDCCH (physical downlink control channel) transmission supporting robustness against beam pair link blocking, the UE can be configured to monitor NR-PDCCH on M beam pair links simultaneously, where M≥1 and a maximum value of M may depend on at least UE capability.

The UE can be configured to monitor NR-PDCCH on different beam pair link(s) in different NR-PDCCH OFDM symbols. Parameters related to UE Rx beam setting for monitoring NR-PDCCH on multiple beam pair links are configured by higher layer signaling or MAC CE and/or considered in a search space design.

At least, NR supports an indication of spatial QCL assumption between DL RS antenna port(s) and DL RS antenna port(s) for demodulation of DL control channel. Candidate signaling methods for beam indication for a NR-PDCCH (i.e. configuration method to monitor NR-PDCCH) are MAC CE signaling, RRC signaling, DCI signaling, specification-transparent and/or implicit method, and combination of these signaling methods.

For reception of unicast DL data channel, NR supports an indication of spatial QCL assumption between a DL RS antenna port and a DMRS antenna port of DL data channel.

Information indicating an RS antenna port is indicated via DCI (downlink grant). The information indicates the RS antenna port which is QCL-ed with the DMRS antenna port. A different set of DMRS antenna ports for the DL data channel can be indicated as QCL with a different set of RS antenna ports.

Hybrid Beamforming

Existing beamforming technology using multiple antennas may be classified into an analog beamforming scheme and a digital beamforming scheme according to a location to which beamforming weight vector/precoding vector is applied.

The analog beamforming scheme is a beamforming technique applied to an initial multi-antenna structure. The analog beamforming scheme may mean a beamforming technique which branches analog signals subjected to digital signal processing into multiple paths and then applies phase-shift (PS) and power-amplifier (PA) configurations for each path.

For analog beamforming, a structure in which an analog signal derived from a single digital signal is processed by the PA and the PS connected to each antenna is required. In other words, in an analog stage, a complex weight is processed by the PA and the PS.

Figure 5:
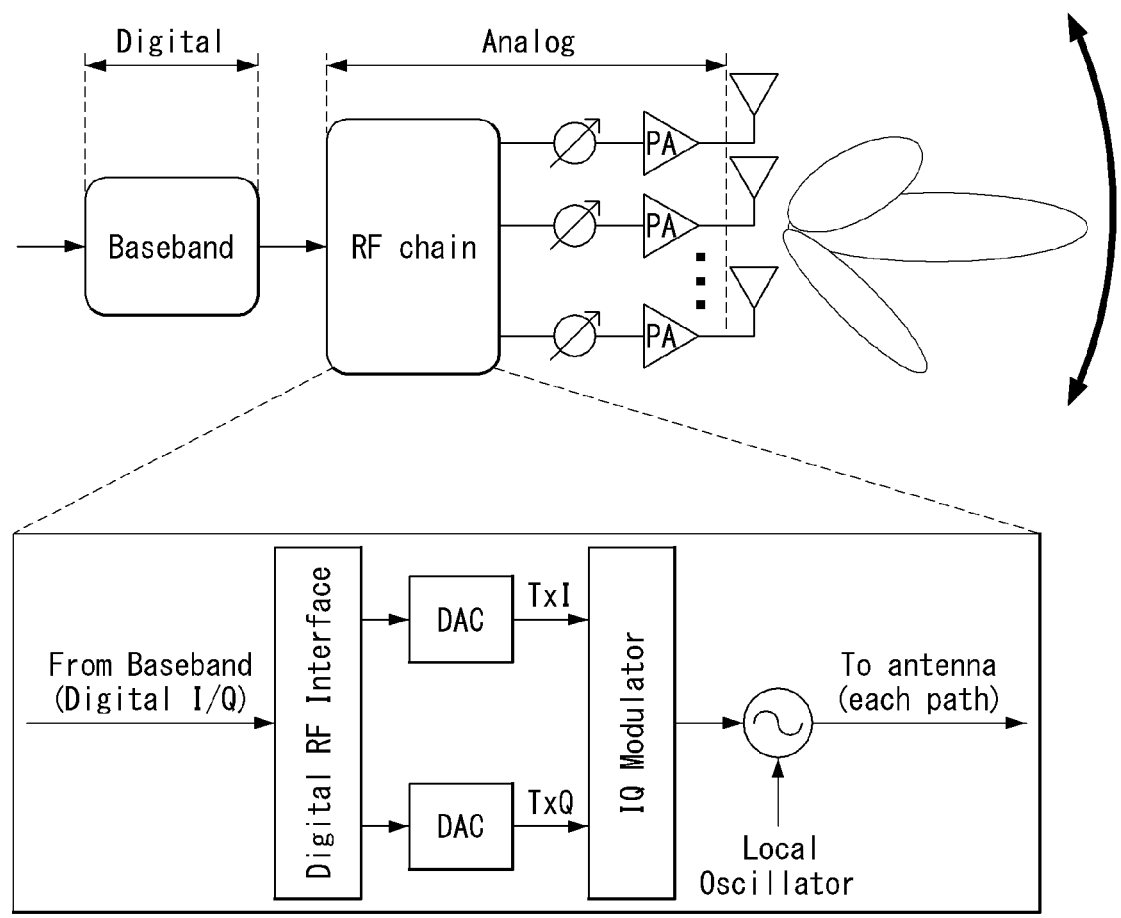
FIG. 5 illustrates an example of a block diagram of a transmitter composed of an analog beamformer and an RF chain.

FIG. 5 illustrates an example of a block diagram of a transmitter composed of an analog beamformer and an RF chain. FIG. 5 is merely for convenience of explanation and does not limit the scope of the present invention.

In FIG. 5, the RF chain means a processing block for converting a baseband (BB) signal into an analog signal. The analog beamforming scheme determines beam accuracy according to characteristics of elements of the PA and PS and may be suitable for narrowband transmission due to control characteristics of the elements.

Further, since the analog beamforming scheme is configured with a hardware structure in which it is difficult to implement multi-stream transmission, a multiplexing gain for transfer rate enhancement is relatively small. In addition, in this case, beamforming per UE based on orthogonal resource allocation may not be easy.

On the contrary, in the case of digital beamforming scheme, beamforming is performed in a digital stage using a baseband (BB) process in order to maximize diversity and multiplexing gain in a MIMO environment.

Figure 6:
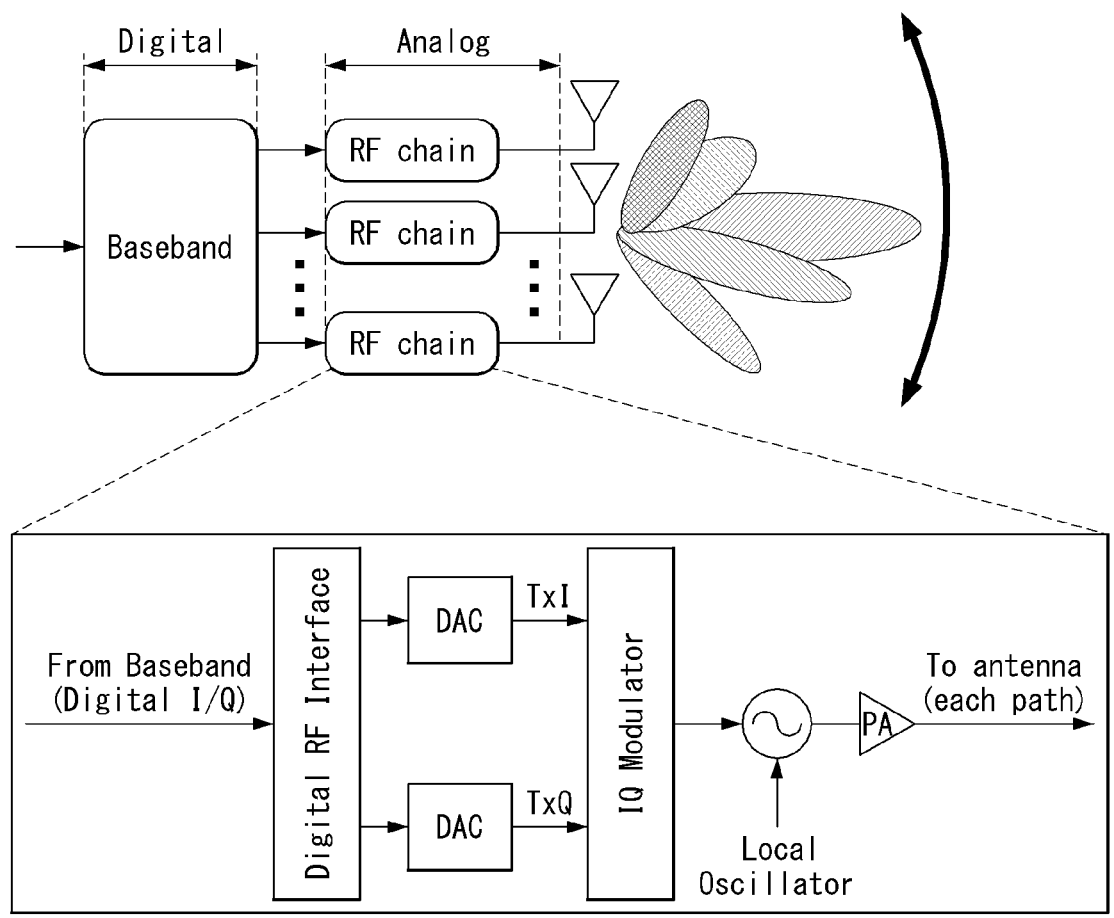
FIG. 6 illustrates an example of a block diagram of a transmitter composed of a digital beamformer and an RF chain.

FIG. 6 illustrates an example of a block diagram of a transmitter composed of a digital beamformer and an RF chain. FIG. 6 is merely for convenience of explanation and does not limit the scope of the present invention.

In FIG. 6, beamforming can be performed as precoding is performed in the BB process. Here, the RF chain includes a PA. This is because a complex weight derived for beamforming is directly applied to transmission data in the case of digital beamforming scheme.

Furthermore, since different beamforming can be performed per UE, it is possible to simultaneously support multi-user beamforming. Besides, since independent beamforming can be performed per UE to which orthogonal resources are assigned, scheduling flexibility can be improved and thus a transmitter operation suitable for the system purpose can be performed. In addition, if a technology such as MIMO-OFDM is applied in an environment supporting wideband transmission, independent beamforming can be performed per subcarrier.

Accordingly, the digital beamforming scheme can maximize a maximum transfer rate of a single UE (or user) based on system capacity enhancement and enhanced beam gain. On the basis of the above-described properties, digital beamforming based MIMO scheme has been introduced to existing 3G/4G (e.g. LTE(-A)) system.

In the NR system, a massive MIMO environment in which the number of transmit/receive antennas greatly increases may be considered. In cellular communication, a maximum number of transmit/receive antennas applied to an MIMO environment is assumed to be 8. However, as the massive MIMO environment is considered, the number of transmit/receive antennas may increase to above tens or hundreds.

If the aforementioned digital beamforming scheme is applied in the massive MIMO environment, a transmitter needs to perform signal processing on hundreds of antennas through a BB process for digital signal processing. Hence, signal processing complexity may significantly increase, and complexity of hardware implementation may remarkably increase because as many RF chains as the number of antennas are required.

Furthermore, the transmitter needs to perform independent channel estimation for all the antennas. In addition, in case of an FDD system, since the transmitter requires feedback information about a massive MIMO channel composed of all antennas, pilot and/or feedback overhead may considerably increase.

On the other hand, when the aforementioned analog beamforming scheme is applied in the massive MIMO environment, hardware complexity of the transmitter is relatively low.

However, an increase degree of a performance using multiple antennas is very low, and flexibility of resource allocation may decrease. In particular, it is difficult to control beams per frequency in the wideband transmission.

Accordingly, instead of exclusively selecting only one of the analog beamforming scheme and the digital beamforming scheme in the massive MIMO environment, there is a need for a hybrid transmitter configuration scheme in which an analog beamforming structure and a digital beamforming structure are combined.

Analog Beam Scanning

In general, analog beamforming may be used in a pure analog beamforming transmitter/receiver and a hybrid beamforming transmitter/receiver. In this instance, analog beam scanning can perform estimation for one beam at the same time. Thus, a beam training time required for the beam scanning is proportional to the total number of candidate beams.

As described above, the analog beamforming necessarily requires a beam scanning process in a time domain for beam estimation of the transmitter/receiver. In this instance, an estimation time $T_s$ for all of transmit and receive beams may be represented by the following Equation 2.

$$T_S = t_s \times (K_T \times K_R) \qquad \text{[Equation 2]}$$

In Equation 2, ts denotes time required to scan one beam, $K_T$ denotes the number of transmit beams, and $K_R$ denotes the number of receive beams.

Figure 7:
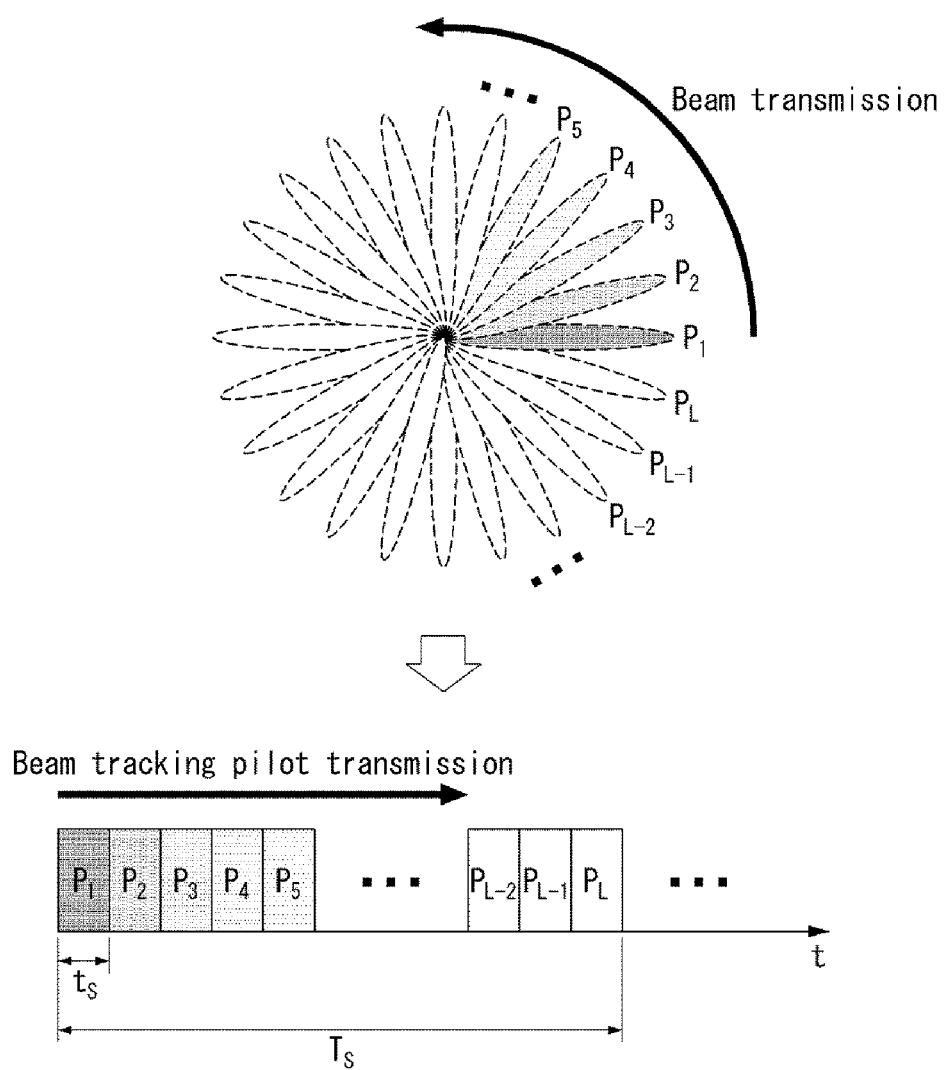
FIG. 7 illustrates an example of an analog beam scanning scheme according to various embodiments of the present invention.

FIG. 7 illustrates an example of an analog beam scanning scheme according to various embodiments of the present invention. FIG. 7 is merely for convenience of explanation and does not limit the scope of the present invention.

In FIG. 7, it is assumed that the total number $K_T$ of transmit beams is L, and the total number $K_R$ of receive beams is 1. In this case, since the total number of candidate beams is L, L time intervals are required in the time domain.

In other words, since only the estimation of one beam can be performed in a single time interval for analog beam estimation, L time intervals are required to estimate all of L beams P1 to PL as shown in FIG. 7. The UE feeds back, to the base station, an identifier (ID) of a beam with a highest signal strength after an analog beam estimation procedure is ended. Namely, as the number of individual beams increases according to an increase in the number of transmit/receive antennas, a longer training time may be required.

Because the analog beamforming changes a magnitude and a phase angle of a continuous waveform of the time domain after a digital-to-analog converter (DAC), a training interval for an individual beam needs to be secured for the analog beamforming, unlike the digital beamforming. Thus, as a length of the training interval increases, efficiency of the system may decrease (i.e., a loss of the system may increase).

Channel State Information (CSI) Feedback

In most cellular systems including the LTE system, a UE receives a pilot signal (reference signal) for channel estimation from a base station, calculates channel state information (CSI), and reports the calculated CSI to the base station.

The base station transmits a data signal based on the CSI fed back from the UE.

In the LTE system, the CSI fed back by the UE includes channel quality information (CQI), a precoding matrix index (PMI), and a rank indicator (RI).

CQI feedback is radio channel quality information provided to the base station for the purpose (link adaptation purpose) of providing a guide as to which modulation and coding scheme (MCS) the base station applies when transmitting data.

If radio quality between the base station and the UE is high, the UE may feedback a high CQI value to the base station, and the base station may transmit data using a relatively high modulation order and a low channel coding rate. On the contrary, if radio quality between the base station and the UE is low, the UE may feedback a low CQI value to the base station, and the base station may transmit data using a relatively low modulation order and a high channel coding rate.

PMI feedback is preferred precoding matrix information provided to the base station for the purpose of providing a guide as to which MIMO precoding scheme the base station applies when installing multiple antennas.

The UE estimates a downlink MIMO channel between the base station and the UE from the pilot signal and recommends which MIMO precoding scheme is applied to the base station through the PMI feedback.

In the LTE system, only linear MIMO precoding that is representable in the form of a matrix is considered in PMI configuration.

The base station and the UE share a codebook composed of multiple precoding matrices, and each MIMO precoding matrix within the codebook has a unique index.

Accordingly, the UE feeds back an index corresponding to a most preferred MIMO precoding matrix within the codebook as a PMI to thereby minimize an amount of feedback information of the UE.

A PMI value needs not be necessarily configured as one index. For example, in the LTE system, when the number of transmit antenna ports is 8, a final 8tx MIMO precoding matrix may be derived by combining two indices (i.e., a first PMI and a second PMI).

RI feedback is information about the number of preferred transmission layers provided to the base station for the purpose of providing a guide to the number of transmission layers preferred by the UE when the UE and the base station enable multi-layer transmission through spatial multiplexing by installing multiple antennas.

The RI has a very close relationship with the PMI. This is because the base station needs to know which precoding will be applied to each layer according to the number of transmission layers.

In PMI/RI feedback configuration, a method of configuring a PMI codebook on the basis of single layer transmission, defining a PMI per layer and feeding back the PMI may be considered. However, the method has a disadvantage in that an amount of PMI/RI feedback information greatly increases due to an increase in the number of transmission layers.

Accordingly, in the LTE system, a PMI codebook has been defined per number of transmission layers. That is, N Nt×R matrices are defined in a codebook for R-layer transmission, where R is the number of layers, Nt is the number of transmit antenna ports, and N is the size of the codebook.

Accordingly, in the LTE system, the size of a PMI codebook is defined irrespective of the number of transmission layers. Since the number R of transmission layers is eventually equal to a rank value of a precoding matrix (Nt×R matrix) as the PMI/RI is defined with such a structure, a term of rank indicator (RI) has been used.

The PMI/RI described in the present specification is not limited to mean an index value and a rank value of a precoding matrix represented as Nt×R matrix, like PMI/RI in the LTE system.

The PMI described in the present specification indicates information of a preferred MIMO precoder among MIMO precoders applicable to a transmitter, and a form of the precoder is not limited to only a linear precoder that can be represented as a matrix as in the LTE system. Further, the RI described in the present specification is interpreted in a broader sense than RI in LTE and includes all of feedback information indicating the number of preferred transmission layers.

The CSI may be obtained in all of system frequency domains and may be also obtained in some frequency domains. In particular, it may be useful for a wideband system to obtain CSI for some preferred frequency domains (e.g. subband) per UE and feedback the CSI.

In the LTE system, CSI feedback is performed on an uplink channel. In general, periodic CSI feedback is performed on a physical uplink control channel (PUCCH), and aperiodic CSI feedback is performed on a physical uplink shared channel (PUSCH) which is an uplink data channel.

The aperiodic CSI feedback is temporarily performed only when the base station desires CSI feedback information, and the base station triggers the CSI feedback on a downlink control channel such as PDCCH/ePDCCH.

When the CSI feedback has been triggered in the LTE system, which information the UE should feedback is classified into PUSCH CSI reporting modes as shown in FIG. 8. The UE is previously informed of which PUSCH CSI reporting mode the UE should operate in through a higher layer message.

FIG. 8 illustrates an example of a PUSCH CSI reporting mode.

The PUCCH CSI reporting mode is also defined for the periodic CSI feedback on the PUCCH.

FIG. 9 illustrates an example of a PUCCH CSI reporting mode.

In the case of PUCCH, since an amount (i.e., a payload size) of data which can be transmitted at once is less than that in the PUSCH, it is difficult to transmit CSI, that needs to be transmitted, at once.

Accordingly, a time at which CQI and PMI are transmitted and a time at which RI is transmitted are different from each other according to each CSI reporting mode. For example, in reporting mode 1-0, only RI is transmitted at a specific PUCCH transmission time, and wideband CQI is transmitted at another PUCCH transmission time. A PUCCH reporting type is defined according to kinds of CSI configured at the specific PUCCH transmission time. For example, a reporting type of transmitting only the RI corresponds to type 3, and a reporting type of transmitting only the wideband CQI corresponds to type 4. A feedback periodicity and an offset value of the RI and a feedback periodicity and an offset value of CQI/PMI are configured to the UE through higher layer message.

The above CSI feedback information is included in uplink control information (UCI).

Reference Signals in LTE

In the LTE system, the purpose of a pilot signal or a reference signal (RS) may be roughly divided as follows.

1. Measurement RS: pilot for channel state measurement
   A. CSI measurement/reporting purpose (short term measurement): purpose of link adaptation, rank adaptation, closed loop MIMO precoding, etc.
   B. Long term measurement/reporting purpose: purpose of handover, cell selection/reselection, etc.
2. Demodulation RS: pilot for physical channel reception
3. Positioning RS: pilot for UE location estimation
4. MBSFN RS: pilot for multi-cast/broadcast service In LTE Rel-8, a cell-specific RS (CRS) has been used for measurement (purpose 1 A/B) and demodulation (purpose 2) for most of downlink physical channels. However, in order to solve RS overhead problem due to an increase in the number of antennas, from LTE Advanced (Rel-10), a CSI-RS is used dedicatedly for CSI measurement (purpose 1A), and a UE-specific RS is used dedicatedly for the reception (purpose 2) of downlink data channel (PDSCH).

The CSI-RS is an RS designed dedicatedly for the CSI measurement and feedback and is characterized by having an RS overhead much lower than the CRS. The CRS supports up to 4 antenna ports, whereas the CSI-RS is designed to support up to 8 antenna ports. The UE-specific RS is designed dedicatedly for demodulation of a data channel and, unlike the CRS, is characterized in that it is an RS (precoded RS) in which a MIMO precoding scheme applied when data is transmitted to the corresponding UE is equally applied to a pilot signal.

Accordingly, as many UE-specific RSs as the number of antenna ports do not need to be transmitted as in the CRS and the CSI-RS, and as many UE-specific RSs as the number of transmission layers (i.e., transmission ranks) are transmitted.

Further, since the UE-specific RS is transmitted for the data channel reception purpose of the corresponding UE in the same resource region as a data channel resource region allocated to each UE through a scheduler of the base station, it is characterized to be UE-specific.

In addition, since the CRS is always transmitted in the same pattern within a system bandwidth so that all of UEs within the cell can use the CRS for the purposes of measurement and demodulation, it is cell-specific.

In LTE uplink, a sounding RS (SRS) has been designed as a measurement RS, and a demodulation RS (DMRS) for an uplink data channel (PUSCH) and a DMRS for an uplink control channel (PUCCH) for ACK/NACK and CSI feedback have been individually designed.

Self-Contained Subframe Structure

A time division duplexing (TDD) structure considered in the NR system is a structure in which both uplink (UL) and downlink (DL) are processed in one subframe. The structure is to minimize a latency of data transmission in a TDD system and is referred to as a self-contained subframe structure.

Figure 10:
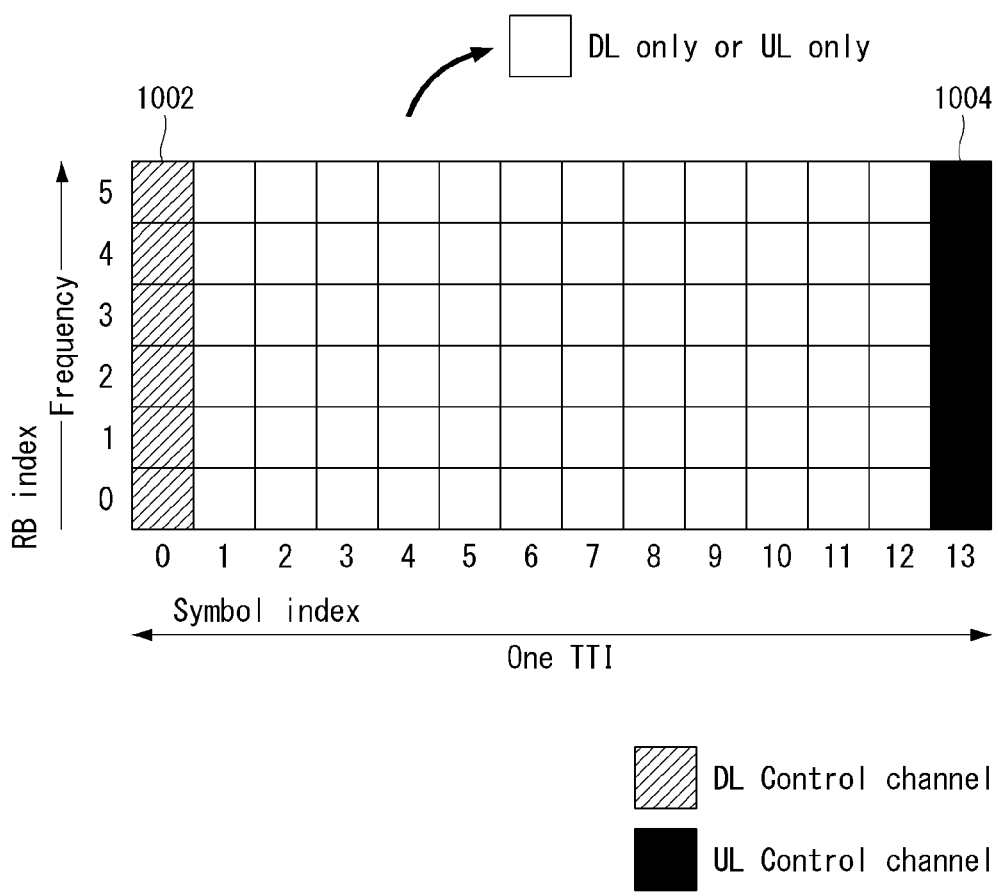
FIG. 10 illustrates an example of a self-contained subframe structure to which a method proposed by the present specification is applicable.

FIG. 10 illustrates an example of a self-contained subframe structure to which a method proposed by the present specification is applicable. FIG. 10 is merely for convenience of explanation and does not limit the scope of the present invention.

Referring to FIG. 10, as in legacy LTE, it is assumed that one subframe is composed of 14 orthogonal frequency division multiplexing (OFDM) symbols.

In FIG. 10, a region 1002 means a downlink control region, and a region 1004 means an uplink control region. Further, regions (i.e., regions without separate indication) other than the region 1002 and the region 1004 may be used for transmission of downlink data or uplink data.

Namely, uplink control information and downlink control information are transmitted in one self-contained subframe. On the other hand, in case of data, uplink data or downlink data is transmitted in one self-contained subframe.

When the structure shown in FIG. 10 is used, downlink transmission and uplink transmission are sequentially performed in one self-contained subframe, and downlink data transmission and uplink ACK/NACK reception can be performed.

As a result, if an error occurs in the data transmission, time required until retransmission of data can be reduced. Hence, the latency related to data transfer can be minimized.

In the self-contained subframe structure shown in FIG. 10, a base station (e.g. eNodeB, eNB, gNB) and/or a user equipment (UE) (e.g. terminal) require a time gap for a process for converting a transmission mode into a reception mode or a process for converting a reception mode into a transmission mode. Regarding the time gap, when uplink transmission is performed after downlink transmission in the self-contained subframe, some OFDM symbol(s) may be configured as a guard period (GP).

3GPP NR will support the following three time-domain behaviors related to CSI reporting. Similarly, reporting for (analog) beam management can also support some or all of the following three time-domain behaviors.

Aperiodic CSI reporting

CSI reporting is performed only in triggering

Semi-persistent CSI reporting

If activation, CSI reporting starts (on specific periodicity), and if deactivation, the CSI reporting is discontinued.

Periodic CSI Reporting

Periodic CSI reporting performs CSI reporting with RRC configured periodicity and slot offset.

A downlink reference signal (DL RS) for channel measurement in CSI acquisition will also support the following three time-domain behaviors. Similarly, a DL RS for beam management can also support some or all of the following three time-domain behaviors.

The DL RS for beam management will basically include a CSI-RS, and other downlink signals may be utilized.

Examples of the other downlink signals may use a mobility RS, a beam RS, a synchronization signal (SS), and a SS block, DL DMRSs (e.g. PBCH DMRS, PDCCH DMRS).

Aperiodic CSI-RS

CSI-RS measurement is performed only in triggering

Semi-persistent CSI-RS

If activation, CSI-RS measurement starts (on specific periodicity), and if deactivation, the CSI-RS measurement is discontinued.

Periodic CSI-RS

Periodic CSI-RS performs CSI-RS measurement with RRC configured periodicity and slot offset.

Further, in CSI acquisition, a zero-power (ZP) CSI-RS based interference measurement method which has been utilized in LTE will be supported to an interference measurement resource (EIR) which is designated to the UE by the base station. In addition, at least one of a non-zero-power (NZP) CSI-RS based interference measurement method or a DMRS based interference measurement method will be supported.

In particular, in the LTE system, ZP CSI-RS based EIR has been configured as semi-static (via RRC signaling), whereas a dynamically configured method will be supported in NR. Also, the following three time-domain behaviors will be supported.

Aperiodic EIR with ZP CSI-RS

Semi-persistent IMR with ZP CSI-RS

Periodic EIR with ZP CSI-RS

Accordingly, channel estimation, interference estimation, and reporting configuring CSI measurement and reporting may use combinations of the following various time domain behaviors.

Hereinafter, aperiodic is simply represented as AP, semi-persistent is simply represented as SP, and periodic is simply represented as PR for convenience of explanation.

Example 1) AP CSI reporting with AP/SP/PR NZP CSI-RS for channel measurement and AP/SP/PR ZP CSI-RS for interference estimation.

Example 2) SP CSI reporting with AP/SP/PR NZP CSI-RS for channel measurement and AP/SP/PR ZP CSI-RS for interference estimation.

Example 3) PR CSI reporting with PR NZP CSI-RS for channel measurement and PR ZP CSI-RS for interference estimation.

In the above examples, it is assumed that AP RS/EIR is used only in AP reporting, SP RS/IMR is used only in AP reporting or SP reporting, and PR RS/IMR is used in all reportings. However, they are not limited thereto.

Further, both RS and MR may be included in resource setting, and their purpose, i.e., channel estimation or interference estimation may be indicated through configuration for each link in measurement setting.

In new rat (NR), PUCCH considers short PUCCH and long PUCCH.

The short PUCCH can be transmitted using one or two OFDM symbols as a time domain and using one or more physical resource blocks (PRBs) as a frequency domain.

The following Table 4 indicates an example of a PUCCH format defined in NR.

TABLE 4

| PUCCH format | Length in OFDM symbols |
|---|---|
| 0 | 1-2 |
| 1 | 4-14 |
| 2 | 1-2 |
| 3 | 4-14 |
| 4 | 4-14 |

In Table 4, PUCCH format 0 and PUCCH format 2 may be the short PUCCH, and PUCCH format 1, PUCCH format 3, and PUCCH format 4 may be the long PUCCH. Next, the long PUCCH can be transmitted using 4 to 12 OFDM symbols as a time domain and using one or more physical resource blocks (PRBs) as a frequency domain.

The short PUCCH may be mainly used as a feedback purpose of fast acknowledge (ACK) or non-acknowledge (NACK) for downlink (DL) data in the above-mentioned self-contained slot structure.

The long PUCCH occupies some resources per UE similar to PUCCH of LTE and may be used as ACK/NACK and CSI feedback purpose.

A minimum number of symbols of the long PUCCH is 4 symbols.

This is because various slot structures or slot formats are considered in NR.

A slot defined in NR is briefly described below.

For subcarrier spacing configuration μ, slots are numbered in increasing order, $n_s^\mu \in \{0, \ldots, N_{slot}^{subframe,\mu}-1\}$ within one subframe and are numbered in increasing order, $n_s^\mu \in \{0, \ldots, N_{slot}^{subframe,\mu}-1\}$ within one (radio) frame.

There are consecutive OFDM symbols $N_{symb}^{slot}$ in a slot, where $N_{symb}^{slot}$ depends on cyclic prefix.

The start of a slot $n_s^\mu$ in a subframe is aligned in time with the start of an OFDM symbol $n_s^{\mu N}{}_{symb}^{slot}$ in the same subframe OFDM symbols in a slot may be classified as 'downlink (D)', 'flexible (X)', or 'uplink (U)'.

In a downlink slot, the UE may assume that downlink transmission occurs only in 'downlink' or 'flexible' symbols.

In an uplink slot, the UE may assume that uplink transmission occurs only in 'uplink' or 'flexible' symbols.

For reference, the number of OFDM symbols included in one slot in NR may be 14 or 7.

Further, a slot structure may include various structures, such as a DL dominant structure (e.g. PDCCH, PDSCH and short PUCCH coexist within a slot) and a UL dominant structure (e.g. PDCCH and PUSCH coexist within a slot) as well as downlink (DL) and uplink (DL).

Hereinafter, CSI feedback attribute transmittable on short PUCCH and CSI feedback attribute transmittable on long PUCCH proposed by the present specification are described.

First, the short PUCCH may previously configure PUCCH resources via RRC and then may turn ON or OFF relatively dynamically corresponding resources in on-demand (e.g. if fast ACK/NACK is necessary).

On the other hand, the long PUCCH may be designed in a form occupying resources in semi-static by RRC configuration similarly to PUCCH of the LTE(-A) system.

Accordingly, the short PUCCH may be more suitable for aperiodic CSI reporting purpose (e.g. fast CSI feedback purpose), and the long PUCCH may be more suitable for semi-persistent/periodic CSI reporting purpose.

However, if a network or a base station is able to determine availability of the short PUCCH to a UE for a specific time interval (in a specific periodicity) (to the corresponding UE), the short PUCCH can be also utilized for the semi-persistent/periodic CSI reporting.

Here, it may be preferable that PUCCH used for the aperiodic CSI reporting purpose is limited to the short PUCCH.

As described above, the short PUCCH is used for the fast feedback purpose, but may be used for the CSI reporting purpose with a very small payload.

CSI Feedback Attribute Transmittable on Short PUCCH

The following CSI feedback information can be transmitted on short PUCCH.

Non-PMI feedback (including CQI, not including PMI, or including compact PMI) for a feedback or reciprocal channel environment for (semi-)open loop (OL) transmission: {CQI, RI}, {CQI}, {CRI, CQI}, {W1, CQI}, etc.

If a DL beam or PMI is able to be determined through an uplink reference signal (RS) as in a time division duplex (TDD) system, non-PMI feedback capable of performing fast CSI acquisition can be supported without a need of PMI feedback requiring much payload.

Alternatively, in a frequency division duplex (FDD) system, operable OL (open loop) MIMO feedback without PMI feedback or only partial PMI (or CRI) information for a semi-open-loop operation may be included in feedback.

fragmented CSI for hybrid CSI or partial feedback (except CQI): combinations of {CRI}, {RI}, {W1}, and {W1, CRI, RI}, {beam identifier (e.g. CRI+port index)}, {beam group identifier}, etc.

As described above, if there is more CSI feedback information, only a part of the CSI feedback information may be utilized preferentially on short PUCCH for the feedback purpose.

For example, in LTE (Rel-14) hybrid CSI mechanism 2, only CRI that is feedback information in a first stage may be transmitted on short PUCCH, and {PMI, CQI, RI} that is feedback information in a second stage may be transmitted on long PUCCH or PUSCH.

Namely, if it is configured so that only CRI is reported to reporting setting or it is configured so that only RI or PMI is reported to reporting setting, it may be configured so that the short PUCCH is used.

Alternatively, in a type similar to LTE PUCCH reporting mode 1-0, RI may be transmitted on short PUCCH, and CQI may be transmitted on long PUCCH or PUSCH.

As described above, when the long PUCCH has a structure in which resources are periodically secured (or configured) in semi-static, and the short PUCCH has a structure in which resources are secured in on-demand, the base station may configure the short PUCCH and the long PUCCH so that they partially or entirely overlap (or collide) in the same frequency and time resources.

In this case, the UE is able to preferentially transmit short PUCCH corresponding to the on-demand and transmit long PUCCH in next secured (or configured) resources.

Here, the meaning of preferentially transmitting the short PUCCH may be the same as the meaning that the long PUCCH is dropped in an overlap region.

CSI Part Updating

Next, a method for updating a part of CSI is described.

When CSI feedback (for corresponding CSI-RS resource) is completed one or more times (on PUCCH or PUSCH) through aperiodic, semi-persistent, and periodic CSI reporting processes until before short PUCCH based CSI feedback transmission, the short PUCCH can be used for the purpose of updating only partial CSI (or only a part of CSI).

In this instance, a UE may perform CSI calculation on the assumption that remaining CSI parameters except a CSI parameter, that is being updated, follow values reported at the most recent time.

Alternatively, a base station may configure or designate which value to assume for some or all of the remaining CSI parameters, or may apply promised rules.

The CSI parameter to be updated may be determined according to a fixed rule, may be configured or designated by the base station, or may be voluntarily selected by the UE.

When the CSI parameter to be updated is selected by the UE, the short PUCCH may be used for the purpose of updating a CSI parameter with the largest change. Which CSI parameter has been updated may be included in feedback information.

As an example of the "fixed rule", a method (e.g. CQI only) of fixing the CSI parameter to be updated on the short PUCCH may be considered.

As another example, a method of promising the CSI parameter to be updated according to time, frequency, code (e.g. sequence ID, OCC, cyclic shift), and/or spatial resource (e.g. DMRS port) of short PUCCH to be used may be considered.

Next, CSI feedback with a very compact PMI is described below.

A method of including a PMI in feedback for closed-loop (CL) MMO transmission may be considered, but this case may be preferable that a feedback PMI payload size is very compact.

In order to reduce the PMI payload size, (1) a method of preliminarily reducing PMI candidates through network configuration or indication (e.g. codebook subset restriction), (2) a method of preliminarily restricting type, configuration, size, subset, etc. of a codebook that can be transmitted on the short PUCCH according to predefined rules, or (3) a method of preliminarily signaling (through capability reporting, etc.) type, configuration, size, subset, etc. of a codebook preferred by the UE may be used.

The methods (1) to (3) may be combined with each other.

For example, after the method (3) is applied, the method (1) may be applied within UE recommendation codebook configuration.

It may be more preferable that PMI reporting information transmitted on the short PUCCH does not include a feedback requiring relatively much payload.

For example, a high spatial resolution codebook, i.e., type II feedback discussed in NR is not included in the PMI reporting information transmitted on the short PUCCH, and it may be preferable that the PMI reporting information supports only type I codebook feedback.

This reason is that, in the worst case, an information amount of type II feedback may exceed twice an information amount of type I feedback.

In this case, although it may be defined to support the type II feedback on the short PUCCH, there is a problem that the implementation complexity of the UE increases considerably.

Accordingly, in order to facilitate the implementation of the UE, it is preferable that the short PUCCH has a restriction not to support the type II feedback with a relatively large amount of feedback.

The type I codebook may be a low spatial resolution codebook.

Here, the type II feedback may be a linear combining codebook type or an explicit feedback type.

Further, if the short PUCCH does not support subband PMI (W2) feedback or if the PMI reporting information transmitted on the short PUCCH supports (or includes) the subband PMI (W2) feedback, a type that does not include a beam selection function via the W2 and performs only co-phasing at 1 to 2 bits may be preferable.

Although the W2 should be calculated and reported originally per subband, the short PUCCH needs to be able to be transmitted by exceptively obtaining only one average value for all bands.

Alternatively, it may be restricted so that the short PUCCH can apply not a dual codebook structure of W1*W2 type but a single codebook type as in LTE Rel-8 codebook.

In this instance, a codebook structure for the short PUCCH may be defined separately.

Alternatively, when the codebook is applied, PMI can be supported with a small payload size by limiting the number of CSI-RS antenna ports and/or a maximum value of RI determining a size of a precoding matrix.

In particular, in short PUCCH based CSI reporting, only PMI+CQI, CRI+CQI, and/or PMI+CQI for port selection can be fed back by a restriction of rank=1.

If the number Y of CSI-RS antenna ports configured or indicated by a base station exceeds the above limit value X, the UE can apply a method for virtualizing Y ports to X ports (according to fixed rules) and then find PMI in a X port codebook.

An example of the method for virtualizing the Y ports to the X ports may configure Y channel estimation values to Y by 1 vector and then multiply a matrix X by Y by the right-hand side to transform into X by 1 vector.

The corresponding matrix may be a port selection matrix generated in a format in which one element has a value of 1 and the other elements have a value of 0 in each row, or a port combining matrix performing a combination using any coefficient.

Further, in short PUCCH based PMI reporting, co-phasing information or PMI components between a plurality of panels may be excluded in (PMI) reporting information.

Alternatively, when PMI reporting is configured using short PUCCH, the UE may not expect that the base station configures the number of CSI-RS ports to above X.

Similar to the PMI, other CSI reporting parameters (e.g. CQI, RI, CRI, etc.) may also use (1) a method of preliminarily reducing CSI parameter candidates through network configuration or indication, (2) a method of preliminarily restricting a range or a resolution, etc. of a CSI parameter according to predefined rules, or (3) a method of preliminarily signaling (through capability reporting, etc.) a CSI parameter preferred by the UE.

As an example of the method of preliminarily restricting the range or the resolution, etc. of the CSI parameter according to the predefined rules, a maximum RI can be limited up to 2 or 4, a maximum number, a limited range/resolution of CQI.

In the application of the methods (1) to (3), in order to further reduce a payload size, two or more CSI parameters may be jointly encoded. For example, CRI and RI may be jointly encoded.

Further, the above methods may be differentially applied for 1 symbol PUCCH and 2 symbol PUCCH.

Further, relatively more CSI feedback information may be transferred to the 2 symbol PUCCH.

Because of a limit of the payload size, the 1 symbol PUCCH transmits only ACK or NACK, and CSI feedback may not be supported to the 1 symbol PUCCH.

For example, the short PUCCH may be designed so that so that the CSI feedback is not supported and only ACK or NACK feedback is supported.

In addition, even if PUCCHs have the same number of symbols, the methods (1) to (3) may be differentially applied to the PUCCHs according to PUCCH format.

Namely, a plurality of (PUCCH) formats may be defined to short PUCCH or long PUCCH having the same number of symbols (for example, according to a maximum number of UEs or a channel coding scheme capable of performing multiplexing), and the size of a payload that can be transmitted for each format may be different.

CSI Feedback Attribute Transmittable on Long PUCCH

Next, CSI feedback using long PUCCH is described in detail.

In the NR system, the number of symbols of long PUCCH may be very variously set to 4 to 12 symbols.

Accordingly, long PUCCH having a small number of symbols may have a relatively larger limit of CSI payload size that can be transmitted, and long PUCCH having a large number of symbols may not have a relatively large limit of CSI payload size that can be transmitted.

Therefore, a type and/or an amount of CSI feedback information that can be transmitted according to the number of PUCCH symbols (and PUCCH format) may vary. Hence, it may be more preferable that (a range of) a supported CSI reporting mode also varies.

When both the number of PUCCH symbols and a size of a frequency domain of PUCCH (e.g. PRB size) vary, a type and/or an amount of CSI feedback information that can be transmitted according to the size of the frequency domain of PUCCH may be differently configured.

For reference, 'A and/or B' used in the present specification may be interpreted as meaning that 'it includes at least one of A or B'.

In this case, as a function of two (or three) parameters including the size of the frequency domain of PUCCH and the number of PUCCH symbols (and PUCCH format), a type and/or an amount of CSI feedback information and (a range of) the CSI reporting mode can be defined.

This method may be equally applied to the above-described short PUCCH.

In the following Tables 5 and 6, it is assumed that X1, X2, Y1, Y2, Y3, Y4, Y5 and Z1 satisfy the conditions of $1 \leq X1 \leq X2$, $Y1 \leq Y2 \leq Y3 \leq Y4 \leq Y5$, and $4 \leq Z1 \leq Z2$.

TABLE 5

| Short PUCCH case | 1 symbol | 2 symbols |
|---|---|---|
| (1~X1) PRB(s) | No CSI feedback (ACK/NACK only) | CSI feedback up to Y1 bits |
| (X1~X2) PRB(s) | CSI feedback up to Y1 bits | CSI feedback up to Y2 bits |

TABLE 6

| Long PUCCH case | 4~Z1 symbols | Z1~12 symbols |
|---|---|---|
| (1~X1) PRB(s) | CSI feedback up to Y3 bits | CSI feedback up to Y4 bits |
| (X1~X2) PRB(s) | CSI feedback up to Y4 bits | CSI feedback up to Y5 bits |

Accordingly, various methods for reducing the CSI payload size that have been described for the short PUCCH may be differentially applied to the long PUCCH according to the number of symbols, a PUCCH format, and/or a frequency size.

This is described in detail below.

For example, long PUCCH having a relatively small number of (OFDM) symbols and/or a small frequency size supports a feedback for (semi-)OL (Open Loop) transmission, a non-PMI feedback for a reciprocal channel environment, fragmented CSI, a partial feedback for hybrid CSI, updating of CSI and/or a part of CSI, and a feedback with very compact PMI.

And, long PUCCH having a relatively large number of symbols and/or a large frequency size is able to support CSI feedback with PMI supporting a closed-loop MIMO operation at a higher resolution (together with the feedback).

The PMI transmitted on the long PUCCH may include subband PMI requiring a relatively large payload size, a feedback for type II codebook (e.g. PMI, matrix index), etc., and can support up to a relatively larger number of CSI-RS antenna ports.

Of course, since a maximum amount of CSI feedback information, which can be transferred on PUSCH, may be greater than that in the long PUCCH even if a maximum number of symbols and a maximum frequency size of the long PUCCH are used, a kind of restriction on the long PUCCH may also be necessary.

For example, in the case of a linear combining codebook represented as Cat1 (category 1) when supporting a long PUCCH based type II codebook, granularity of a maximum number L or a combining coefficient (phase and/or size) of beams that can be combined in a codebook in consideration of a subband payload size may be limited.

Alternatively, a supported maximum rank may be limited. For example, CSI feedback for rank 1 of a type II Cat1 codebook may require approximately 100 to 200 bits.

Because CSI feedback for rank N may require a payload size of about N times a value of the rank 1, a maximum rank supported on the long PUCCH can be limited (e.g. supporting only if rank=1).

Further, in case of LTE, a subband size is fixed according to a size of a carrier. On the other hand, in case of NR, two configurable subband sizes are defined for each range of a carrier bandwidth part (BWP).

Namely, a base station can configure one of two candidate subband sizes for a component carrier (CC) or a BWP of a specific size.

The following Table 7 illustrates an example of subband sizes defined in NR.

TABLE 7

| Carrier bandwidth part (PRBs) | Subband Size (PRBs) |
|---|---|
| <24 | N/A |
| 24-72 | 4, 8 |

TABLE 7-continued

| Carrier bandwidth part (PRBs) | Subband Size (PRBs) |
|---|---|
| 73-144 | 8, 16 |
| 145-275 | 16, 32 |

In a system applying the above-described method, a required payload size of CSI feedback may vary according to a subband size configured by the base station.

First, a method for differently defining a maximum number of configurable subbands according to a PUCCH type (or format) (e.g. short PUCCH or long PUCCH, PUCCH PRB sizes) is described.

For example, long PUCCH of NR has been configured with three formats (PUCCH format 1, PUCCH format 3, and PUCCH format 4), and PUCCH format 3 and PUCCH format 4 may be configured or used as a CSI feedback purpose.

The PUCCH format 3 may be configured to have a plurality of PRB sizes, whereas the PUCCH format 4 is defined so that PRB size=1.

Accordingly, even in the case of the long PUCCH, the PUCCH format 4 can transmit only an amount (about 115 bits) of CSI that is relatively less than the PUCCH format 3.

Accordingly, it may be more preferable that the number of subbands (or subband size) that can be configured is limited in the PUCCH format 4.

The number of subbands calculated by the above Table 7 is represented by the following Table 8.

TABLE 8

| Carrier bandwidth part (PRBs) | Subband Size (PRBs) | # of Subbands |
|---|---|---|
| <24 | N/A | N/A |
| 24-72 | 4, 8 | [3, 18] |
| 73-144 | 8, 16 | [5, 18] |
| 145-275 | 16, 32 | [9, 18] |

In case of subband (SB) CSI reporting, as the number of SBs increases, a feedback payload size also increases.

For example, in a section in which a size of a BWP is 145 to 275 PRBs, when a subband size is set to 16 PRBs, 18 subbands are present, and reported SB CQI and PMI increase to a multiple of the number of subbands (18 subbands).

For this reason, the UE does not expect that the subband size is configured as in the following Table 9.

TABLE 9

| Carrier bandwidth part (PRBs) | Subband Size (PRBs) |
|---|---|
| <24 | N/A |
| 24-72 | 4 |
| 73-144 | 8 |
| 145-275 | 16 |

Alternatively, as a default value of the subband size is configured according to the BWP as in the following Table 10, in the PUCCH based SB reporting, the UE does not expect the case where the SB size is configured to values other than the default value, or the UE performs the CSI reporting according to the default value of the following Table 10 even if the SB size is configured to values other than the default value.

TABLE 10

| Carrier bandwidth part (PRBs) | Default Subband Size (PRBs) |
|---|---|
| <24 | N/A |
| 24-72 | 8 |
| 73-144 | 16 |
| 145-275 | 32 |

Further, since a factor affecting the payload is a type of a codebook used by the UE, (as described above) granularity of a maximum number L or a combining coefficient (phase and/or size) of beams, that can be combined in a type I codebook or a type II codebook, may be limited or a rank may be limited.

More specifically, in case of Type I single panel codebook used in NR, i.e., in case of CodebookMode=1, the number of beams configuring W1 in a dual stage codebook (W=W1*W2) is 1 (if codebook mode=1). If codebook mode=2, the number of beams configuring the W1 is calculated as 4.

When the number of beams is large, a payload size of W2 corresponding to SB PMI increases.

Accordingly, if the Type I single panel codebook is used in PUCCH based SB reporting with or without a proposed limit of the subband size, the UE may limit the configuration of CodebookMode=2 or may not expect the configuration of CodebookMode=2.

Further, in case of a Type I multi-panel codebook, a WB panel corrector is used if codebook mode=1, and a SB panel corrector is used if codebook mode=2.

The panel corrector functions to adjust a phase between the panels and improves a performance of the multi-panel codebook.

Similar to the Single-panel, if codebook mode=2, a payload size of SB PMI increases. Therefore, if the Type I multi-panel codebook is used in the PUCCH based SB reporting with or without the proposed limit of the subband size, the UE may limit the configuration of CodebookMode=2 or may not expect the configuration of CodebookMode=2.

Constraints related to the configuration of the codebook may be limitedly applied to specific subband number(s) or subband size(s).

Further, in semi-persistent/periodic CSI reporting, both short PUCCH and long PUCCH are configured with RRC, and a transmitting operation may be defined (or configured) using the long PUCCH when an amount of CSI feedback to be reported to each CSI reporting instance is a specific threshold or more (irrespective of combinations of CSI parameters) and using the short PUCCH when the amount of CSI feedback is the specific threshold or less.

Further, in the configuration of a plurality of long PUCCHs or short PUCCHs, the transmitting operation may be defined or configured on long PUCCH or short PUCCH composed of a larger number of symbols when the amount of CSI feedback is an additionally defined threshold or more according to the number of symbols of long PUCCHs or short PUCCHs, and the transmitting operation may be defined or configured on long PUCCH or short PUCCH composed of a smaller number of symbols when the amount of CSI feedback is the additionally defined threshold or less.

In addition, PUSCH resources may be included in RRC configuration. In this case, when an amount of CSI feedback of a specific threshold or more needs to be transmitted, it may be prescribe or configured that the PUSCH resources should be used.

In summary, for example, a plurality of thresholds are present, and PUSCH, long PUCCH with a large number of symbols, long PUCCH with a small number of symbols, 2 symbol PUCCH, and 1 symbol PUCCH may be sequentially used in order of the total amount of CSI feedback to be transmitted to each reporting instance.

Figure 11:
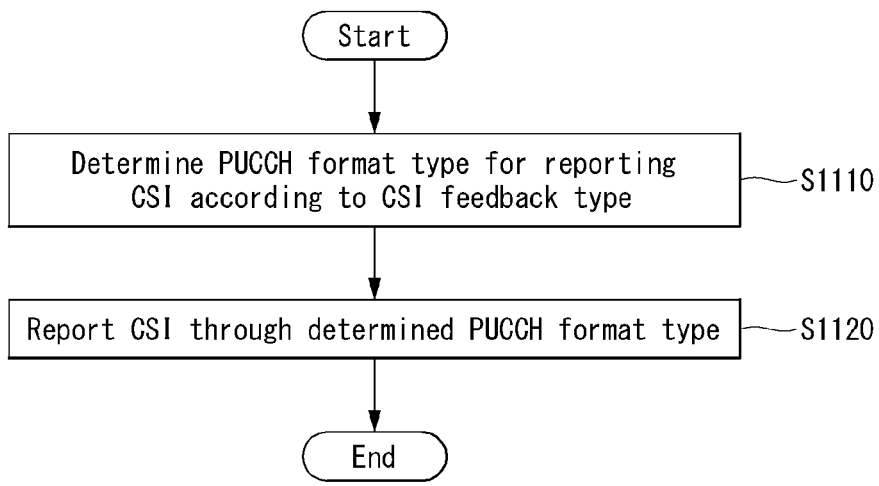
FIG. 11 is a flow chart illustrating an example of a UE operation performing CSI reporting proposed by the present specification.

FIG. 11 is a flow chart illustrating an example of a UE operation performing CSI reporting proposed by the present specification.

Namely, FIG. 11 illustrates an operation of a UE reporting channel state information (CSI) in a wireless communication system.

First, the UE determines a physical uplink control channel (PUCCH) format type for reporting the CSI according to a CSI feedback type in S1110.

Here, the PUCCH format type may be short PUCCH or long PUCCH.

Afterwards, the UE reports the CSI to a base station through the determined PUCCH format type in S1120.

The CSI reporting may be represented as CSI feedback, CSI transmission, etc.

Here, if the determined PUCCH format type is the short PUCCH, the reported CSI can support type I CSI feedback. If the determined PUCCH format type is the long PUCCH, the reported CSI can support type I CSI feedback and type II CSI feedback.

As described above, a reason to restrict CSI feedback transmitted on the short PUCCH as the type I CSI feedback is as follows.

In the worst case, an information amount of type II feedback may exceed twice an information amount of type I feedback.

In this case, although it may be defined to support the type II feedback on the short PUCCH, there is a problem that the implementation complexity of the UE increases considerably.

Accordingly, in order to facilitate the implementation of the UE, it is preferable that the short PUCCH has a restriction not to support the type II feedback with a relatively large amount of feedback.

More specifically, the CSI reported on the short PUCCH does not support subband (SB) type I CSI feedback. Namely, the CSI reported on the short PUCCH can support only wideband (WB) type I CSI feedback.

Further, the CSI reported on the long PUCCH can support subband (SB) type I CSI feedback.

The reported CSI may be configured as aperiodic, periodic, or semi-persistent by the network or the base station.

However, periodic CSI reporting on the long PUCCH may not support Type II CSI feedback.

This reason is that the periodic CSI reporting may increase the implementation complexity from UE's perspective because the Type II CSI feedback is sophisticated and includes a large amount of information.

In this case, the type I CSI feedback may be represented as type I PMI or type I codebook (feedback), etc., and the type II CSI feedback may be represented as type II PMI or type II codebook (feedback), etc.

As described above, the type I codebook may mean a low spatial resolution codebook, and the type II codebook may mean a high spatial resolution codebook.

More specifically, the type I CSI feedback is related to a function of beam selection and/or co-phasing on layers through W2 after beam group selection through W1.

Further, the type II CSI feedback is related to a function of beam selection and/or co-phasing on layers through W2 after beam group selection through W1.

For example, the type I CSI feedback selects 2 beams as the W1 and selects one of 2 beams as the W2, whereas the type II CSI feedback gives a degree of freedom of generating a beam having new direction and phase through linear combination (LC) of 2 beams to increase a spatial resolution.

Further, the long PUCCH includes PUCCH format 4, and an amount of CSI transmitted on the PUCCH format 4 may be up to 115 bits.

Namely, a CSI feedback payload size for the PUCCH format 4 does not exceed 115 bits.

If the short PUCCH and the long PUCCH partially or entirely overlap each other in the same time and frequency resources, the short PUCCH may be transmitted preferentially.

Namely, this may be interpreted as meaning that the long PUCCH transmission is dropped, and an example of drop implementation may be rate matching, puncturing, and the like.

Further, if the CSI is reported on the long PUCCH and supports the type II CSI feedback, the CSI may be a part of CSI (or fragmented CSI).

More specifically, if the CSI is reported on the long PUCCH, Type II SB CSI can allow only part I to be transmitted.

Namely, it means that configuration of part II transmission is not allowed.

For reference, Type II WB CSI can send both the part I and the part II.

However, if the UE encodes the Type II WB CSI, the part I and the part II are not divided, and the encoding is performed using one part.

Here, the part I may be CRI, RI, CQI1 (CQI for 1st codeword (CW)), and/or NZBI, and the part II may be PMI and CQI2 (CQI for 2nd CW).

Here, NZBI indicates the number of non-zero wideband amplitude coefficients per layer.

Accordingly, if the Type II CSI feedback is reported and configured on the long PUCCH, only CRI/RI/CQI/NZBI may be reported, and (remaining) PMI is omitted in the reporting.

Here, NZBI is information indicating how many beams are combined in a LC codebook and is selected and reported by the UE. NZBI may be partial information of PMI.

If the base station configures L value, when the UE performs linear combination in W2 while selecting and reporting L beam groups as W1, some M (<=L) beam groups to apply a non-zero amplitude, i.e., to perform the combining among the L beam groups may mean information reporting 'M'.

General Device to which the Present Disclosure May be Applied

Figure 12:
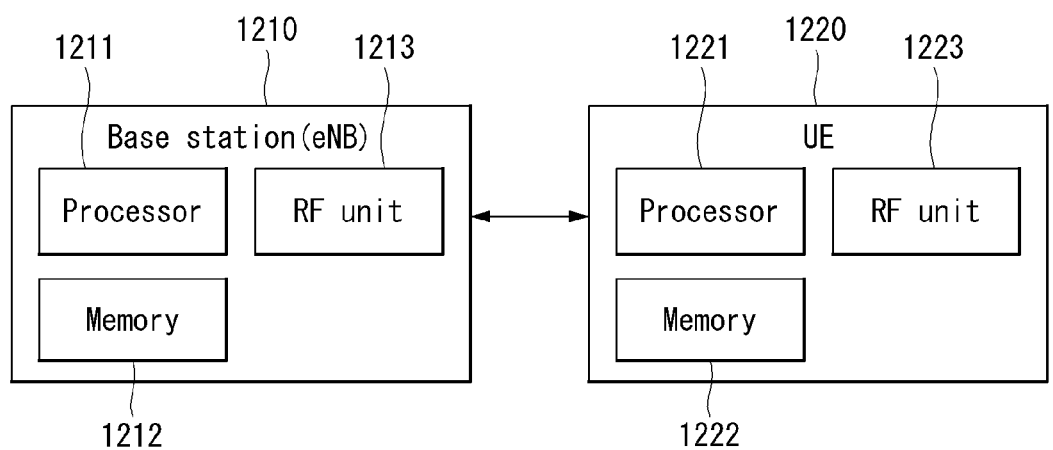
FIG. 12 is a block diagram illustrating a configuration of a wireless communication device according to an embodiment of the present invention.

FIG. 12 is a block diagram of a wireless communication device to which methods proposed in the present disclosure may be applied.

Referring to FIG. 12, a wireless communication system includes a base station (or network) 1210 and a UE 1220.

The base station includes a processor 1211, a memory 1212, and a communication module 1213.

The processor 1211 implements functions, procedures, and/or methods proposed in FIGS. 1 to 11. Layers of a wireless interface protocol may be implemented by the processor 1211. The memory 1212 is connected to the processor 1211 and stores various types of information required to drive the processor 1211. The communication module 1213 is connected to the processor 1211 to transmit and/or receive a wireless signal.

The communication module 1213 may include a radio frequency (RF) unit for transmitting/receiving a wireless signal.

The UE includes a processor 1221, a memory 1222, and a communication module (or RF unit) 1223. The processor 1221 implements functions, procedures, and/or methods proposed in FIGS. 1 to 11. Layers of a wireless interface protocol may be implemented by the processor 1221. The memory 1222 is connected to the processor 1221 and stores various types of information required to drive the processor 1221. The communication module 1223 is connected to the processor to transmit and/or receive a wireless signal.

The memory 1212 or 1222 may be inside or outside the processor 1211 or 1221, and may be connected to the processor 1211 or 1221 through various well-known means.

In addition, the base station 1210 and/or the UE 1220 may have a single antenna or multiple antennas.

Figure 13:
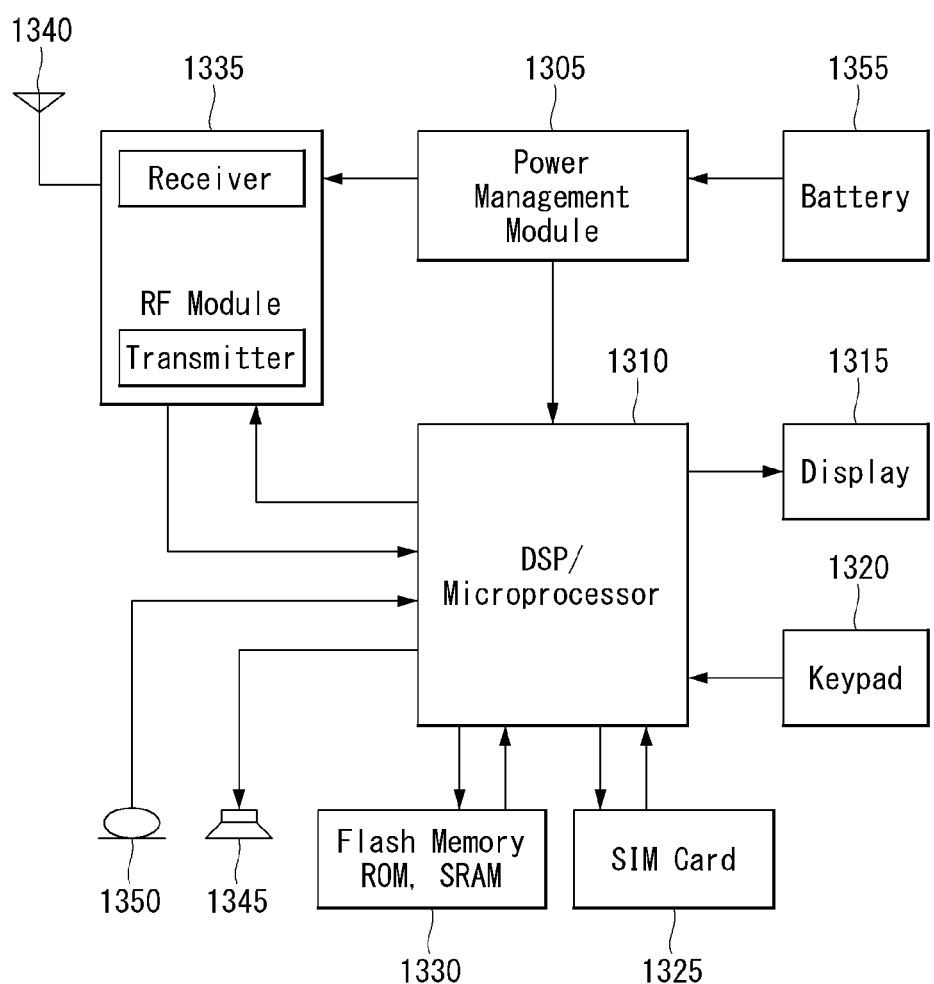
FIG. 13 is a block diagram illustrating a configuration of a communication device according to an embodiment of the present invention.

FIG. 13 is a block diagram of a communication device according to an embodiment of the present disclosure.

Particularly, FIG. 13 is a diagram illustrating a UE shown in FIG. 12 in more detail.

Referring to FIG. 13, the UE includes a processor (or digital signal processor; DSP) 1310, an RF module (RF unit) 1335, a power management module 1305, an antenna 1340, a battery 1355, a display 1315, a keypad 1320, a memory 1330, a Subscriber Identification Module (SIM) card 1325 (which may be optional), a speaker 1345 and a microphone 1350. The UE may include a single antenna or multiple antennas.

The processor 1310 may be configured to implement the functions, procedures and/or methods proposed by the present disclosure as described in FIGS. 1 to 11. Layers of a wireless interface protocol may be implemented by the processor 1310.

The memory 1330 is connected to the processor 1310 and stores information related to operations of the processor 1310. The memory 1330 may be located inside or outside the processor and may be connected to the processors through various well-known means.

A user enters instructional information, such as a telephone number, for example, by pushing the buttons of a keypad 1320 or by voice activation using the microphone 1350. The processor receives and processes the instructional information to perform the appropriate function, such as to dial the telephone number. Operational data may be retrieved from the SIM card 1325 or the memory 1330 to perform the function. Furthermore, the processor may display the instructional and operational information on the display 1315 for the user's reference and convenience.

The RF module 1335 is connected to the processor, transmits and/or receives an RF signal. The processor forwards instructional information to the RF module, to initiate communication, for example, transmits radio signals comprising voice communication data. The RF module includes a receiver and a transmitter to receive and transmit radio signals. An antenna 1340 facilitates the transmission and reception of radio signals. Upon receiving radio signals, the RF module may forward and convert the signals to baseband frequency for processing by the processor. The processed signals may be transformed into audible or readable information outputted via the speaker 1345.

Figure 14:
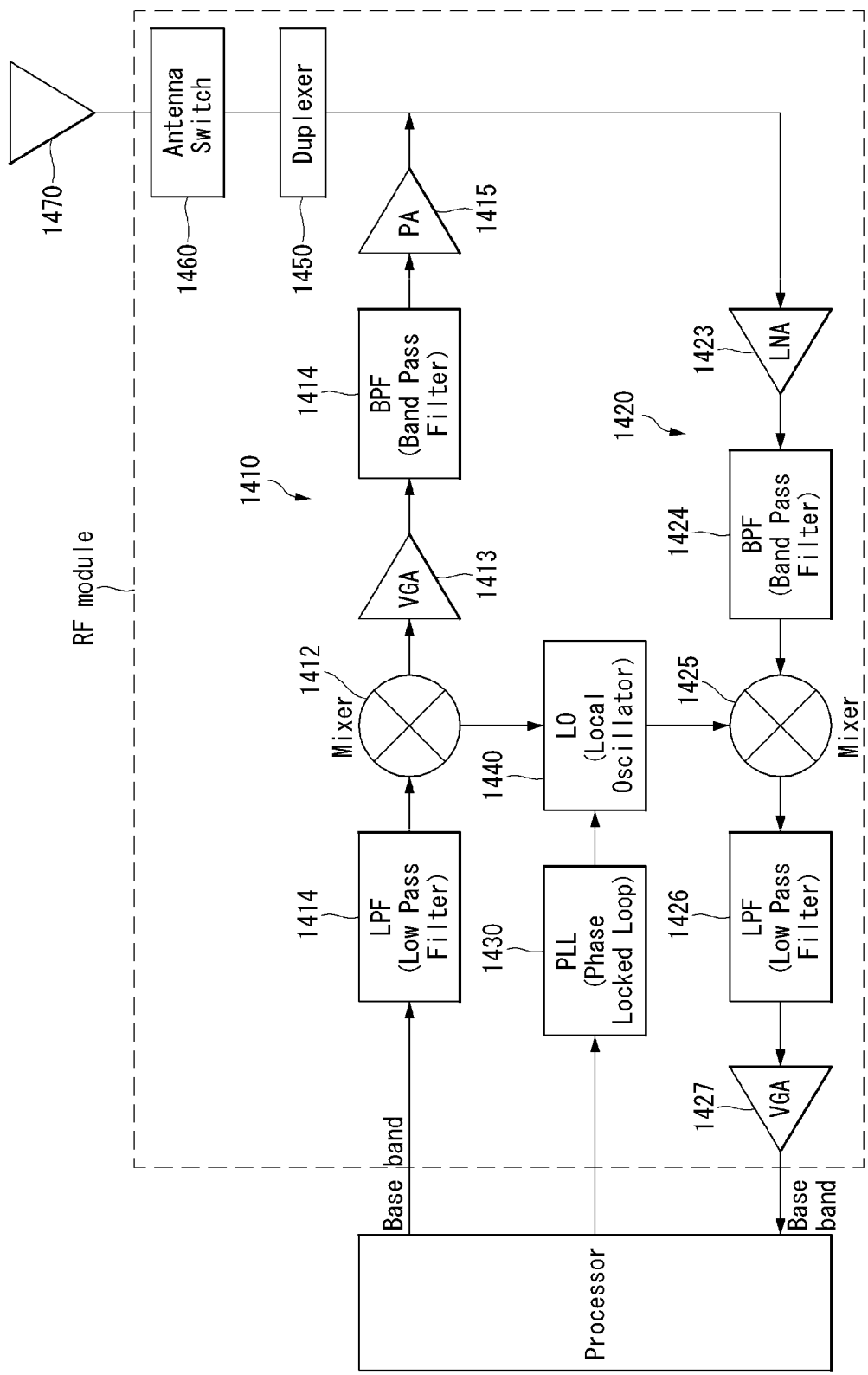
FIG. 14 illustrates an example of a radio frequency (RF) module of a wireless communication device to which a method proposed by the present specification is applicable.

FIG. 14 is a diagram illustrating an example of an RF module of a wireless communication apparatus to which the method proposed in the present disclosure may be applied.

Particularly, FIG. 14 shows an example of an RF module that may be implemented in Frequency Division Duplex (FDD) system.

First, in a transmit path, the processor described in FIGS. 12 and 13 processes data to be transmitted and provides an analog output signal to transmitter 1410.

Within the transmitter 1410, the analog output signal is filtered by a low pass filter (LPF) 1411 to remove undesired images caused by prior digital-to-analog conversion (ADC), upconverted from baseband to RF by an upconverter (Mixer) 1412, and amplified by a variable gain amplifier (VGA) 1413. The amplified signal is filtered by a filter 1414, further amplified by a power amplifier (PA) 1415, routed through duplexer(s) 1450/antenna switch(s) 1460, and transmitted via an antenna 1470.

In addition, in the receive path, an antenna 1470 receives signals from exterior and provides the received signals, which is routed through antenna switch(s) 1460/duplexer(s) 1450 and provided to the receiver 1420.

Within the receiver 1420, the received signal is amplified by a low noise amplifier (LNA) 1423, filtered by a band pass filter 1424, and downconverted from RF to baseband by a downconverter (Mixer) 1425.

The downconverted signal is filtered by a low pass filter (LPF) 1426, and amplified by a VGA 1427 to obtain an analog input signal, which is provided to the processor described in FIG. 12 and FIG. 13.

Further, a local oscillator (LO) generator 1440 generates and provides transmission and reception LO signals to upconverter 1412 and downconverter 1425, respectively.

In addition, a phase locked loop (PLL) 1430 may receive control information from the processor and provide control signals to LO generator 1440 to generate the transmission and reception LO signals at the proper frequencies.

The circuits shown in FIG. 14 may be arranged differently from the configuration shown in FIG. 14.

Figure 15:
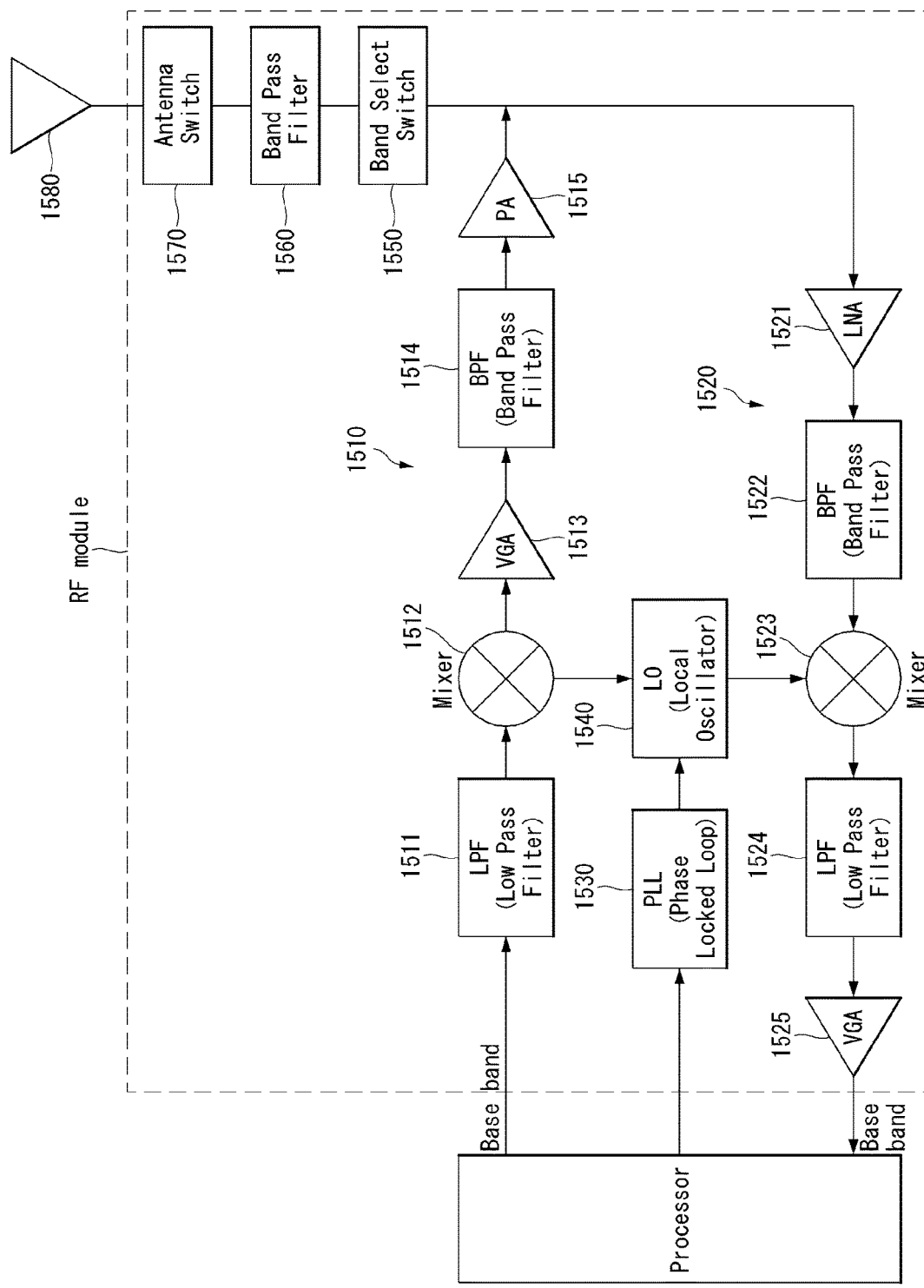
FIG. 15 illustrates another example of an RF module of a wireless communication device to which a method proposed by the present specification is applicable.

FIG. 15 is a diagram illustrating another example of an RF module of a wireless communication apparatus to which the method proposed in the present disclosure may be applied.

Particularly, FIG. 15 shows an example of an RF module that may be implemented in Time Division Duplex (TDD) system.

The transmitter 1510 and the receiver 2520 of the RF module in the TDD system are the same as the structures of the transmitter and the receiver of the RF module in the FDD system.

Hereinafter, only the structure of the RF module of the TDD system is described, which is different from the RF module of the FDD system, and the same structure is referred to the description of FIG. 14.

The signal amplified by a power amplifier (PA) 1515 of a transmitter is routed through a band select switch 1550, a band pass filter (BPF) 1560 and an antenna switch(s) 1570, and transmitted via an antenna 1580.

Further, in the receive path, the antenna 1580 receives signals from exterior and provides the received signals, which is routed through the antenna switch(s) 1570, the band pass filter (BPF) 1560, and the band select switch 1550, and provided to the receiver 1520.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present disclosure may be achieved by various means, for example, hardware, firmware, software, or a combination thereof. In a hardware configuration, the methods according to the embodiments of the present disclosure may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

INDUSTRIAL APPLICABILITY

Although a method of reporting CSI in the wireless communication system according to the present invention has been described with reference to examples applied to a NR system and a 5G system, it is also applicable to various wireless communication systems.

The invention claimed is:

1. A method of transmitting, by a user equipment (UE), a channel state information (CSI) in a wireless communication system, the method comprising:
receiving, from a base station (BS), RRC information including configuration information for the CSI;
determining a physical uplink control channel (PUCCH) resource for the CSI based on the RRC information; and
transmitting, to the BS, the CSI based on the PUCCH resource,
wherein a short PUCCH is transmitted in one or two symbols, and a long PUCCH is transmitted in at least four symbols,
wherein the long PUCCH includes a PUCCH format 1, a PUCCH format 3 and a PUCCH format 4,
wherein a size of the CSI transmitted through the PUCCH format 4 is up to 115 bits,
wherein a payload for the CSI includes a first part and a second part, and
wherein based on that the CSI is transmitted through the long PUCCH and includes information for a second codebook type of a subband unit, only the first part of the payload is transmitted.

2. The method of claim 1, wherein based on that the PUCCH resource used for the CSI is the short PUCCH, a codebook for precoding corresponds to a first codebook type,
wherein based on that the PUCCH resource used for the CSI is the long PUCCH, the codebook corresponds to a second codebook type,
wherein the first codebook type is a codebook supporting low spatial resolution, and
wherein the second codebook type is a codebook supporting high spatial resolution.

3. The method of claim 1, wherein based on that the CSI in which the short PUCCH is used is transmitted, a precoding rank value is 1.

4. The method of claim 1, wherein the CSI includes information for a precoding matrix, and
wherein based on that a short PUCCH is used for the CSI, the information for the precoding matrix further includes at least one of information for co-phasing between antenna ports or information for antenna port selection.

5. The method of claim 1, wherein based on transmission of the short PUCCH and transmission of the long PUCCH completely or partially overlapping in same time and frequency resource, the short PUCCH preferentially is transmitted.

6. A user equipment (UE) configured to transmit a channel state information (CSI) in a wireless communication system, the UE comprising:
at least one transceiver; and
at least one processor functionally connected to the at least one transceiver,
wherein the at least one processor is configured to:
receive, from a base station (BS), RRC information including configuration information for the CSI;
determine a physical uplink control channel (PUCCH) resource for the CSI based on the RRC information; and
transmit, to the BS, the CSI based on the PUCCH resource,
wherein a short PUCCH is transmitted in one or two symbols, and a long PUCCH is transmitted in at least four symbols,
wherein the long PUCCH includes a PUCCH format 1, a PUCCH format 3 and a PUCCH format 4, and
wherein a size of the CSI transmitted through the PUCCH format 4 is up to 115 bits,
wherein a payload for the CSI includes a first part and a second part, and
wherein based on that the CSI is transmitted through the long PUCCH and includes information for a second codebook type of a subband unit, only the first part of the payload is transmitted.

* * * * *